United States Patent
Makino

(10) Patent No.: US 11,621,436 B2
(45) Date of Patent: Apr. 4, 2023

(54) SOLID ELECTROLYTE COMPOSITION, MANUFACTURING METHOD THEREOF, STORAGE METHOD THEREOF, KIT THEREOF, SOLID ELECTROLYTE-CONTAINING SHEET, STORAGE METHOD THEREOF, KIT THEREOF, AND ALL-SOLID STATE SECONDARY BATTERY

(71) Applicant: FUJIFILM Corporation, Tokyo (JP)

(72) Inventor: Masaomi Makino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 16/816,283

(22) Filed: Mar. 12, 2020

(65) Prior Publication Data

US 2020/0212482 A1    Jul. 2, 2020

Related U.S. Application Data

(63) Continuation of application No. PCT/JP2018/032177, filed on Aug. 30, 2018.

(30) Foreign Application Priority Data

Sep. 14, 2017 (JP) .............. JP2017-176352

(51) Int. Cl.
*H01M 10/0562* (2010.01)
*H01M 10/0525* (2010.01)
*H01M 10/0585* (2010.01)

(52) U.S. Cl.
CPC .......... *H01M 10/0562* (2013.01); *H01M 10/0525* (2013.01); *H01M 10/0585* (2013.01); *H01M 2300/0068* (2013.01)

(58) Field of Classification Search
CPC ....... H01B 1/06; H01B 1/10; H01M 10/0525; H01M 10/0562; H01M 10/0585;
(Continued)

(56) References Cited

U.S. PATENT DOCUMENTS

| 9,236,158 B2 | 1/2016 | Kubo et al. |
| 2008/0017834 A1 | 1/2008 | Skulason et al. |

(Continued)

FOREIGN PATENT DOCUMENTS

| CN | 102498590 | 6/2012 |
| CN | 105609870 | 5/2016 |

(Continued)

OTHER PUBLICATIONS

Machine Translation JP2012138346(A) (Year: 2012).*

(Continued)

Primary Examiner — Victoria H Lynch
(74) Attorney, Agent, or Firm — JCIPRNET

(57) ABSTRACT

A solid electrolyte composition containing a sulfide-based solid electrolyte having conductivity of ions of metals belonging to Group I or II of the periodic table, a binder, and a dispersion medium, in which an amount of dissolved oxygen in the solid electrolyte composition is 20 ppm or less, a manufacturing method thereof, a storage method thereof, and a kit thereof, a solid electrolyte-containing sheet having a layer made of the solid electrolyte composition, a storage method thereof, and a kit thereof, and an all-solid state secondary battery.

24 Claims, 1 Drawing Sheet

(58) Field of Classification Search
CPC ......... H01M 2300/0068; H01M 4/131; H01M 4/1391; H01M 4/525; H01M 4/622; H01M 4/623; H01M 4/625; Y02E 60/10; Y02P 70/05
See application file for complete search history.

(56) References Cited

U.S. PATENT DOCUMENTS

| | | | |
|---|---|---|---|
| 2011/0076570 A1 | 3/2011 | Hama et al. | |
| 2012/0208070 A1 | 8/2012 | Nakashima et al. | |
| 2016/0204465 A1 | 7/2016 | Mimura et al. | |
| 2019/0027780 A1* | 1/2019 | Liu | H01M 10/058 |

FOREIGN PATENT DOCUMENTS

| | | |
|---|---|---|
| JP | H04134252 | 5/1992 |
| JP | H06275314 | 9/1994 |
| JP | H08167425 | 6/1996 |
| JP | H10321256 | 12/1998 |
| JP | 2001068149 | 3/2001 |
| JP | 2009538973 | 11/2009 |
| JP | 2010033918 | 2/2010 |
| JP | 2010113820 | 5/2010 |
| JP | 2011076792 | 4/2011 |
| JP | 2012138346 | 7/2012 |
| JP | 2012199003 | 10/2012 |
| JP | 2012204114 | 10/2012 |
| JP | 2012212652 | 11/2012 |
| KR | 20160046882 | 4/2016 |
| WO | 2013145480 | 10/2013 |

OTHER PUBLICATIONS

Office Action of Japan Counterpart Application, with English translation thereof, dated Sep. 29, 2020, pp. 1-8.
"Partial Supplementary Search Report of Europe Counterpart Application", dated Oct. 5, 2020, p. 1-p. 17.
"Office Action of Japan Counterpart Application" with English translation thereof, dated Mar. 30, 2021, p. 1-p. 10.
"International Search Report (Form PCT/ISA/210) of PCT/JP2018/032177," dated Dec. 4, 2018, with English translation thereof, pp. 1-7.
"Written Opinion of the International Searching Authority (Form PCT/ISA/237) of PCT/JP2018/032177," dated Dec. 4, 2018, with English translation thereof, pp. 1-13.
Office Action of Korea Counterpart Application, with English translation thereof, dated Oct. 7, 2021, pp. 1-18.
"Search Report of Europe Counterpart Application", dated Feb. 3, 2021, p. 1-p. 15.
"Office Action of Japan Counterpart Application" with English translation thereof, dated Sep. 7, 2021, p. 1-p. 12.
"Office Action of Korea Counterpart Application" with English translation thereof, dated Apr. 15, 2022, p. 1-p. 6.
Office Action of Korean Counterpart Application, with English translation thereof, dated Jun. 17, 2022, pp. 1-7.
Office Action of China Counterpart Application, with English translation thereof, dated Sep. 5, 2022, pp. 1-38.
Office Action of Korea Counterpart Application, with English translation thereof, dated Sep. 29, 2022, pp. 1-15.
Office Action of Korea Counterpart Application, with English translation thereof, dated Jan. 30, 2023, pp. 1-6.

* cited by examiner

SOLID ELECTROLYTE COMPOSITION, MANUFACTURING METHOD THEREOF, STORAGE METHOD THEREOF, KIT THEREOF, SOLID ELECTROLYTE-CONTAINING SHEET, STORAGE METHOD THEREOF, KIT THEREOF, AND ALL-SOLID STATE SECONDARY BATTERY

CROSS-REFERENCE TO RELATED APPLICATIONS

This application is a Continuation of PCT International Application No. PCT/JP2018/032177 filed on Aug. 30, 2018, which claims priority under 35 U.S.C. § 119 (a) to Japanese Patent Application No. 2017-176352 filed in Japan on Sep. 14, 2017. Each of the above applications is hereby expressly incorporated by reference, in its entirety, into the present application.

BACKGROUND OF THE INVENTION

1. Field of the Invention

The present invention relates to a solid electrolyte composition and a manufacturing method thereof, a solid electrolyte-containing sheet, and an all-solid state secondary battery. In addition, the present invention relates to a storage method and a kit of a solid electrolyte composition and a storage method and a kit of a solid electrolyte-containing sheet.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in reliability and safety.

Under such circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety and reliability which are considered as a problem of batteries in which the organic electrolytic solution is used can be significantly improved, and it also becomes possible to extend the service lives. Furthermore, all-solid state secondary batteries can be provided with a structure in which the electrodes and the electrolyte are directly disposed in series. Therefore, it becomes possible to increase the energy density to be higher than that of secondary batteries in which the organic electrolytic solution is used, and the application to electric vehicles, large-sized storage batteries, and the like is anticipated.

Due to the respective advantages described above, research and development of all-solid state secondary batteries as next-generation lithium ion batteries are underway. As a solid electrolyte that is used in all-solid state secondary batteries, a sulfide-based inorganic solid electrolyte exhibiting an ion conductivity almost as high as that of a liquid electrolyte appears promising. However, this sulfide-based inorganic solid electrolyte is highly reactive, and, for example, in the case of coming into contact with water, the sulfide-based inorganic solid electrolyte reacts or decomposes, deteriorates, and no longer exhibits the intrinsic high ion conductivity. Therefore, in the case of forming a constituent layer of an all-solid state secondary battery using a slurry containing the sulfide-based inorganic solid electrolyte, a solvent or dispersant having a small moisture content is used in order to suppress the deterioration of the sulfide-based inorganic solid electrolyte (for example, Paragraph [0007] of JP1998-321256A (JP-H10-321256A)), JP2012-204114A, JP2010-113820A, JP2012-199003A, and JP2012-212652A describe techniques of using a previously dehydrated solvents for sulfide-based inorganic solid electrolytes.

SUMMARY OF THE INVENTION

As a result of studying sulfide-based solid electrolytes, the present inventors newly found that sulfide-based solid electrolytes do not only deterioration by moisture but are also subject to a slowly-progressing deterioration phenomenon. This deterioration does not rapidly progress.

However, particularly from a perspective of long-term performance maintenance and a viewpoint of industrial production, it becomes particularly important to further suppress this deterioration as well and thus stably maintain the high ion conductivity that sulfide-based solid electrolytes intrinsically exhibit for a long period of time in terms of the manufacturing of all-solid state secondary batteries exhibiting excellent battery performance.

An object of the present invention is to provide a solid electrolyte composition and a solid electrolyte-containing sheet capable of stably maintaining a high ion conductivity for a long period of time and a manufacturing method of the solid electrolyte composition.

In addition, another object of the present invention is to provide a storage method of a solid electrolyte composition and a solid electrolyte-containing sheet capable of maintaining a high ion conductivity, a solid electrolyte composition kit and a solid electrolyte-containing sheet kit that are preferably used in this storage method.

Furthermore, still another object of the present invention is to provide an all-solid state secondary battery in which the solid electrolyte composition or the solid electrolyte-containing sheet is used.

As a result of repeating a variety of studies, the present inventors found that, in the case of setting the amount of dissolved oxygen in a sulfide-based solid electrolyte composition to a specific range, for the sulfide-based solid electrolyte, it is possible to effectively suppress the above-described slowly-progressing deterioration phenomenon and to maintain a high ion conductivity for a long period of time. Furthermore, it was found that, in the case of using the sulfide-based solid electrolyte composition or solid electrolyte-containing sheet in which the amount of dissolved oxygen is set to the specific range as a layer constituent material of an all-solid state secondary battery, an all-solid state secondary battery having excellent battery performance can be industrially manufactured in a stable manner. The present invention was completed by further repeating studies on the basis of the above-described finding.

That is, the above-described objects have been achieved by the following means.

<1> A solid electrolyte composition comprising a sulfide-based solid electrolyte (A) having conductivity of ions of metals belonging to Group I or II of the periodic table, a binder (B), and a dispersion medium (C), in which an amount of dissolved oxygen in the solid electrolyte composition is 20 ppm or less.

<2> The solid electrolyte composition according to <1>, in which a moisture content in the solid electrolyte composition is 50 ppm or less.

<3> The solid electrolyte composition according to <1> or <2>, in which the dispersion medium (C) is a hydrocarbon compound solvent, an ester compound solvent, an ether compound solvent, a ketone compound solvent, or a combination of two or more thereof.

<4> The solid electrolyte composition according to any one of <1> to <3>, in which the dispersion medium (C) is a compound having 7 to 14 carbon atoms.

<5> The solid electrolyte composition according to any one of <1> to <4>, in which the dispersion medium (C) has a hydrocarbon group and the hydrocarbon group has a branched structure or a cyclic structure.

<6> The solid electrolyte composition according to any one of <1> to <5>, in which the dispersion medium (C) contains 20% to 100% by mass of a hydrocarbon compound solvent.

<7> The solid electrolyte composition according to any one of <1> to <6>, in which the binder (B) includes a (meth)acrylic polymer, a urethane polymer, a urea polymer, an amide polymer, an imide polymer, an ester polymer, hydrocarbon rubber, or fluorine rubber, or a combination of two or more thereof which has a weight-average molecular weight of 1,000 to 500,000.

<8> The solid electrolyte composition according to any one of <1> to <7>, in which the binder (B) includes a polymer having at least one functional group selected from the group of functional groups consisting of a hydroxy group, a carboxy group, a sulfo group, a phosphoric acid group, an amino group, and a nitrile group.

<9> The solid electrolyte composition according to any one of <1> to <8>, in which the binder (B) is polymer particles having an average particle diameter of 0.01 to 10 µm.

<10> The solid electrolyte composition according to any one of <1> to <9>, further comprising an active material (D).

<11> The solid electrolyte composition according to any one of <1> to <10>, further comprising a conductive auxiliary agent (E).

<12> The solid electrolyte composition according to any one of <1> to <11>, further comprising an oxygen scavenger (F).

<13> A manufacturing method of the solid electrolyte composition according to any one of <1> to <12>, the method comprising: a step of mixing a sulfide-based solid electrolyte (A) and a dispersion medium (C); and a step of deoxidizing an obtained mixture so that the amount of dissolved oxygen in the mixture reaches 20 ppm or less.

<14> A manufacturing method of the solid electrolyte composition according to any one of <1> to <12>, the method comprising: a step of mixing the sulfide-based solid electrolyte (A) and a dispersion medium (C1) deaerated to an amount of dissolved oxygen of 1 ppm or less in an inert gas atmosphere.

<15> A solid electrolyte composition kit formed by combining the solid electrolyte composition according to any one of <1> to <12> and an oxygen scavenger (F).

<16> A storage method of a solid electrolyte composition, in which the solid electrolyte composition according to any one of <1> to <12> is subjected to at least one of steps described below.

(i) A step of storing the solid electrolyte composition in an inert gas atmosphere in a sealed environment.

(ii) A step of storing the solid electrolyte composition after being impregnated with an oxygen scavenger (F).

(iii) A step of storing the solid electrolyte composition together with the oxygen scavenger (F) in a sealed environment.

<17> A storage method of a solid electrolyte composition, in which the solid electrolyte composition is stored together with the oxygen scavenger (F) in a sealed environment using the solid electrolyte composition kit according to <15>.

<18> A solid electrolyte-containing sheet comprising a layer made of a solid electrolyte composition including a sulfide-based solid electrolyte (A) having conductivity of ions of metals belonging to Group I or II of the periodic table, a binder (B), and a dispersion medium (C), in which an amount of dissolved oxygen included in a pore in the solid electrolyte-containing sheet is 20 ppm or less.

<19> The solid electrolyte-containing sheet according to <18>, in which the solid electrolyte composition is the solid electrolyte composition according to any one of <1> to <12>.

<20> A storage method of a solid electrolyte-containing sheet, in which the solid electrolyte-containing sheet is stored in a sealed environment having an oxygen concentration of 20 ppm or less.

<21> A solid electrolyte-containing sheet kit formed by combining a solid electrolyte-containing sheet and an oxygen scavenger (F).

<22> A storage method of a solid electrolyte-containing sheet, in which the solid electrolyte-containing sheet is stored in a sealed environment in the presence of the oxygen scavenger (F) using the solid electrolyte-containing sheet kit according to <21>.

<23> An all-solid state secondary battery obtained by the solid electrolyte composition according to any one of <1> to <12> or the solid electrolyte-containing sheet according to <18> or <19>.

The present invention is capable of providing a solid electrolyte composition and a solid electrolyte-containing sheet capable of stably maintaining a high ion conductivity for a long period of time and a manufacturing method of the solid electrolyte composition. In addition, the present invention is capable of providing a storage method of a solid electrolyte composition and a solid electrolyte-containing sheet capable of maintaining a high ion conductivity, a solid electrolyte composition kit and a solid electrolyte-containing sheet kit that are preferably used in this storage method. Furthermore, the present invention is capable of providing an all-solid state secondary battery in which the solid electrolyte composition or the solid electrolyte-containing sheet is used.

The above-described and other characteristics and advantages of the present invention will be further clarified by the following description with appropriate reference to the accompanying drawings.

DESCRIPTION OF THE PREFERRED EMBODIMENTS

Figure 1:
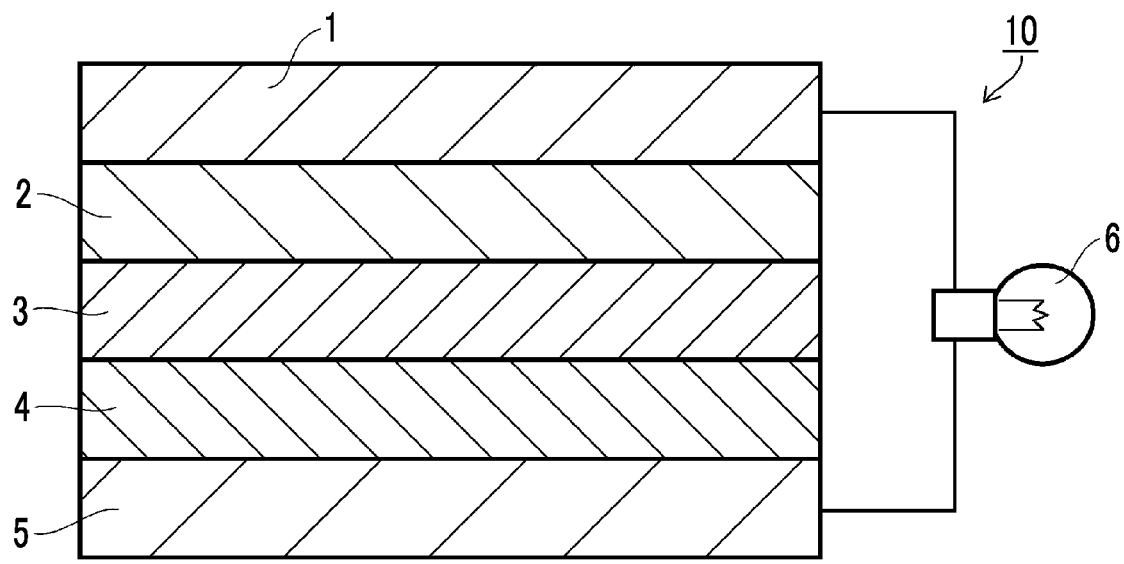
FIG. 1 is a vertical cross-sectional view schematically illustrating an all-solid state secondary battery according to a preferred embodiment of the present invention.

In the present specification, numerical ranges expressed using "to" include numerical values before and after the "to" as the lower limit value and the upper limit value.

In the present specification, the term "(meth)acrylic" means methacrylic and/or acrylic. In addition, the term "(meth)acryloyl" means methacryloyl and/or acryloyl.

In the present specification, in a case in which there is a plurality of substituents and/or linking groups indicated by a specific reference or a case in which a plurality of substituents or the like (similarly, also the number of substituents) is defined simultaneously or selectively, the respective substituents or the like may be identical to or different from each other. In addition, in a case in which a plurality of substituents or the like is close to each other, the substituents or the like may bond or condense to each other to form a ring. Meanwhile, the number of carbon atoms in a substituent or the like having a substituent means the total number of carbon atoms.

In the present specification, regarding an expression "compound" (for example, in a case in which a substance is called with "compound" at the end), the expression is used to mean not only the compound but also a salt thereof and an ion thereof.

<Solid Electrolyte Composition>

A solid electrolyte composition of an embodiment of the present invention contains a sulfide-based solid electrolyte (A) having conductivity of ions of metals belonging to Group I or II of the periodic table, a binder (B), and a dispersion medium (C).

The amount of dissolved oxygen in the solid electrolyte composition of the embodiment of the present invention is 20 ppm or less. In a case in which the amount (volume proportion) of oxygen dissolved (contained) in the solid electrolyte composition of the embodiment of the present invention containing the above-described components is 20 ppm or less, it is possible to suppress the above-described slowly-progressing deterioration which is unique to sulfide-based solid electrolytes. A detailed reason therefor is not yet clear, but is considered that, in a case in which the amount of oxygen gas coexisting with the sulfide-based solid electrolyte is set to 20 ppm or less, it is possible to suppress or significantly delay a reaction (oxidation reaction) with the sulfide-based solid electrolyte, a ligand exchange reaction, or the like, and it is possible to prevent the decomposition (deterioration) of the sulfide-based solid electrolyte.

The oxygen gas being dissolved in the solid electrolyte composition needs to be oxygen gas present in the solid electrolyte composition in a state of being measurable using a measurement method described below and also includes, in addition to one present as the oxygen gas in the solid electrolyte composition, an oxygen molecule, an ion, or the like being adsorbed or the like to the solid electrolyte or the like. That is, an oxygen molecule (compound) or the like bonding to a substance such as the solid electrolyte by a chemical bond is not regarded as the oxygen gas.

The amount of dissolved oxygen in the solid electrolyte composition is preferably 10 ppm or less, more preferably 5 ppm or less, and still more preferably 1 ppm or less since the solid electrolyte composition is capable of stably maintaining the high ion conductivity of the sulfide-based solid electrolyte for a long period of time (exhibits high temporal stability). The lower limit value of the amount of dissolved oxygen is realistically 0.001 ppm or more, but is preferably 0.01 ppm or more and more preferably 0.1 ppm or more since the solid electrolyte composition is excellent in mass production without impairing the high temporal stability.

In the present invention, the amount of dissolved oxygen refers to the amount (the volume proportion in a medium (in the case of a slurry, the dispersion medium volume; in the case of a sheet, the volume of a pore in the sheet) in the solid electrolyte composition) of the oxygen gas being dissolved (contained) in the solid electrolyte composition and is, specifically, a value measured using a method described in examples described below.

In the solid electrolyte composition of the embodiment of the present invention, the occurrence of a reaction between the oxygen gas and the sulfide-based solid electrolyte (a decrease in the dissolved oxygen) can be suppressed, and thus a point in time for measuring the amount of dissolved oxygen in the solid electrolyte composition is not particularly limited; however, generally, a value measured after the preparation of the solid electrolyte composition is regarded as the amount of dissolved oxygen.

A method for setting or adjusting the amount of dissolved oxygen to the above-described range will be described below.

In the solid electrolyte composition of the embodiment of the present invention, the moisture content (mass proportion) is preferably 50 ppm or less, more preferably 20 ppm or less, still more preferably 10 ppm or less, and particularly preferably 5 ppm or less. In a case in which the moisture content of the solid electrolyte composition is small, it is possible to suppress the deterioration of the sulfide-based solid electrolyte by water. Therefore, this solid electrolyte composition exhibits a high ion conductivity and can be used to manufacture an all-solid state secondary battery having excellent battery performance by being used as a layer-constituting material of the all-solid state secondary battery.

This moisture content refers to the amount of water being contained in the solid electrolyte composition and is, specifically, a value measured using a method described in the examples described below.

In the solid electrolyte composition of the embodiment of the present invention, the sulfide-based solid electrolyte (A) and the binder (B) may be liberated (dispersed) from each other; however, generally, the binder (B) and the sulfide-based solid electrolyte (A) are closely attached to each other. In an electrode sheet for an all-solid state secondary battery and an active material layer, the binder (B) is preferably closely attached not only to the inorganic solid electrolyte (A) but also to an active material, a conductive auxiliary agent, or the like described below.

Hereinafter, components that the solid electrolyte composition of the embodiment of the present invention contains and components that the solid electrolyte composition is capable of containing will be described.

<(A) Sulfide-Based Inorganic Solid Electrolytes>

In the present invention, the sulfide-based inorganic solid electrolyte is an inorganic sulfide-based solid electrolyte, and the solid electrolyte refers to a solid-form electrolyte capable of migrating ions therein. The inorganic solid electrolyte is clearly differentiated from organic solid electrolytes (polymer electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the sulfide-based inorganic solid electrolyte is a solid in a static state and thus, generally, is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The sulfide-based inorganic solid electrolyte is not particularly limited as long as the inorganic solid electrolyte has conductivity of ions of metals belonging to Group I or II of the periodic table and is generally a substance not having electron conductivity.

In the present invention, the sulfide-based inorganic solid electrolyte has conductivity of ions of metals belonging to Group I or II of the periodic table. In a case in which an all-solid state secondary battery of the embodiment of the present invention is an all-solid state lithium ion secondary battery, the sulfide-based inorganic solid electrolyte preferably has ion conductivity of a lithium ion.

Sulfide-based inorganic solid electrolytes are preferably compounds which contain sulfur atoms (S), have ion conductivity of metals belonging to Group I or II of the periodic table, and further have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

As the sulfide-based inorganic solid electrolyte, for example, lithium ion-conductive sulfide-based inorganic solid electrolytes satisfying a composition represented by Formula (I) are exemplified.

Formula (I)

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method for synthesizing sulfide-based inorganic solid electrolyte materials using the above-described raw material compositions include an amorphization method. Examples of the amorphization method include a mechanical milling method, a solution method, and a melting quenching method. This is because treatments at a normal temperature become possible, and it is possible to simplify manufacturing steps.

The sulfide-based inorganic solid electrolyte is preferably a particle. The volume-average particle diameter of the sulfide-based inorganic solid electrolyte particles is not particularly limited, but is preferably 0.01 μm or more and more preferably 0.1 μm or more. The upper limit is preferably 100 μm or less and more preferably 50 μm or less. The average particle diameter of the sulfide-based inorganic solid electrolyte particles is measured in the following order. One percent by mass of a dispersion liquid is diluted and prepared using the sulfide-based inorganic solid electrolyte particles and water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

The sulfide-based inorganic solid electrolytes may be used singly or two or more inorganic solid electrolytes may be used in combination.

In a case in which a decrease in the interface resistance and the maintenance of the decreased interface resistance in the case of being used in the all-solid state secondary battery are taken into account, the content of the sulfide-based inorganic solid electrolyte in the solid component of the solid electrolyte composition is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99% by mass or less.

However, in a case in which the solid electrolyte composition contains an active material described below, regarding the content of the inorganic solid electrolyte in the solid electrolyte composition, the total content of the active material and the inorganic solid electrolyte is preferably in the above-described range.

In the present invention, the solid content (solid component) refers to a component that does not volatilize or evaporate and disappear in the case of carrying out a drying treatment on the solid electrolyte composition in a nitrogen atmosphere at 170° C. for six hours. Typically, the solid content refers to a component other than a dispersion medium described below.

<(B) Binder>

The binder that the solid electrolyte composition of the embodiment of the present invention contains is not particularly limited as long as the binder is a binder polymer that is generally used in solid electrolyte compositions for an all-solid state secondary battery. As the binder, preferably, a binder made of a (meth)acrylic polymer, a urethane polymer, a urea polymer, an amide polymer, an imide polymer, an ester polymer, hydrocarbon rubber, fluorine rubber, or the like is preferably exemplified.

The (meth)acrylic polymer is not particularly limited as long as the (meth)acrylic polymer is a polymer formed of a (meth)acrylic monomer, and examples thereof include polymethyl (meth)acrylate, poly(meth)acrylic acid, polyhydroxymethyl (meth)acrylate, and the like. In addition, a polymer described in JP2015-088486A is also preferably exemplified.

As the urethane polymer, the urea polymer, the amide polymer, the imide polymer, and the ester polymer, polymers described in JP2015-088480A are preferably exemplified respectively.

As the hydrocarbon rubber, natural rubber, polybutadiene, polyisoprene, polystyrene-butadiene, or hydrated polymers thereof are exemplified.

The fluorine rubber preferably has a repeating unit derived from vinylidene fluoride, and, as such a polymer, polyvinylidene difluoride, polyvinylidene difluoride hexafluoropropylene, and the like are exemplified.

The polymers forming the binder may be one kind or two or more kinds.

The binder preferably includes a polymer having at least one functional group selected from the following group of functional groups. In a case in which the polymer forming the binder has a functional group, the polymer interacts with inorganic particles of the sulfide-based inorganic solid electrolyte, an active material, a conductive auxiliary agent, and the like to be capable of enhancing a binding property.

(Group of Functional Groups)

A hydroxy group, a carboxy group, a sulfo group, a phosphoric acid group, an amino group, and a nitrile group.

The carboxy group, the sulfo group, and the phosphoric acid group each may be a salt thereof or an ester thereof. Examples of the salt include a sodium salt, a calcium salt, and the like. As the ester, an alkyl ester, an aryl ester, and the like are exemplified.

A group capable of forming a salt such as a hydroxy group or an amino group may be a salt.

The amino group is not particularly limited, and examples thereof include an amino group having 0 to 20 carbon atoms. The amino group includes an alkylamino group and an arylamino group.

The binder is preferably polymer particles. In this case, the average particle diameter of the polymer particles is preferably 0.01 to 10 μm and more preferably 0.01 to 1 μm. As the average particle diameter of the polymer particles, similar to the average particle diameter of the sulfide-based inorganic solid electrolyte particles, a measured average value is employed.

The average particle diameter can be measured from the produced all-solid state secondary battery by, for example, disassembling the battery, peeling the electrodes off, then, measuring the average particle diameters of the electrode materials, and excluding the measurement value of the average particle diameter of particles other than the polymer particles which has been measured in advance.

As the polymer particles, commercially available polymer particles may be used, and polymer particles described in JP2016=139511 A can be preferably used.

The weight-average molecular weight of the binder, particularly, the above-described polymer is preferably 1,000 to 500,000 and more preferably 5,000 to 500,000.

In the present invention, unless particularly otherwise described, the weight-average molecular weight of the binder refers to a standard polystyrene-equivalent weight-average molecular weight by gel permeation chromatography (GPC). Regarding a measurement method thereof, basically, a value measured using a method under conditions A or conditions B (preferred) described below is employed. However, depending on the kind of the binder polymer, an appropriate eluent may be appropriately selected and used.

(Conditions A)

Column: Two TOSOH TSKgel SuperAWM-H's (trade name) are connected to each other.

Carrier: 10 mM LiBr/N-methyl pyrrolidone

Measurement temperature: 40° C.

Carrier flow rate: 1.0 mL/min

Concentration of specimen: 0.1% by mass

Detector: Refractive index (RI) detector (Conditions B) Preferred

Column: A column obtained by connecting TOSOH TSKgel SuperHZM-H (trade name), TOSOH TSKgel SuperHZ4000 (trade name), and TOSOH TSKgel SuperHZ2000 (trade name) is used.

Carrier: Tetrahydrofuran

Measurement temperature: 40° C.

Carrier flow rate: 1.0 mL/min

Concentration of specimen: 0.1% by mass

Detector: Refractive index (RI) detector

The content of the binder in the solid electrolyte composition is preferably 0.01% by mass or more, more preferably 0.1% by mass or more, and still more preferably 1% by mass or more with respect to 100% by mass of the solid component from the viewpoint of a binding property with the inorganic particle and the ion conductivity. From the viewpoint of battery characteristics, the upper limit is preferably 20% by mass or less, more preferably 10% by mass or less, and still more preferably 5% by mass or less.

In the solid electrolyte composition of the embodiment of the present invention, the mass ratio of the total mass (total amount) of the sulfide-based inorganic solid electrolyte (A) and the active material to the mass of (B) the binder [(the mass of the sulfide-based inorganic solid electrolyte and the mass of the active material)/(the mass of (B) the binder)] is preferably in a range of 1,000 to 1. This ratio is more preferably 500 to 2 and still more preferably 100 to 10.

<(C) Dispersion Medium>

The dispersion medium that the solid electrolyte composition of the embodiment of the present invention contains needs to be one dispersing the respective components included in the solid electrolyte composition of the embodiment of the present invention, and examples thereof include a variety of organic solvents. As the organic solvents that can be used as the dispersion medium, an alcohol compound solvent, an ether compound solvent, an amide compound solvent, an amino compound solvent, a ketone compound solvent, an aromatic compound solvent, an aliphatic compound solvent, a nitrile compound solvent, an ester compound, and the like are exemplified. Among these, a hydrocarbon compound solvent (an aromatic compound solvent and an aliphatic compound solvent), an ester compound solvent, an ether compound solvent, or a ketone compound solvent is preferred.

Examples of an alcohol compound solvent include methyl alcohol, ethyl alcohol, 1-propyl alcohol, 2-propyl alcohol, 2-butanol, ethylene glycol, propylene glycol, 1,6-hexanediol, cyclohexane diol, 1,3-butanediol, and 1,4-butanediol.

As an ether compound solvent, alkylene glycols (triethylene glycol and the like), alkylene glycol monoalkyl ethers (ethylene glycol monomethyl ether and the like), alkylene glycol dialkyl ethers (ethylene glycol dimethyl ether and the like), dialkyl ethers (diisopropyl ether, dibutyl ether, and the like), and cyclic esters (tetrahydrofuran, dioxanes (including each of 1,2-, 1,3-, and 1,4-isomers, and the like).

Examples of an amide compound solvent include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of an amino compound solvent include triethylamine, diisopropylethylamine, tributylamine, and the like.

Examples of a ketone compound include acetone, methyl ethyl ketone, methyl isobutyl ketone, cyclopentanone, cyclohexanone, cycloheptanone, dipropyl ketone, dibutyl ketone, diisopropyl ketone, diisobutyl ketone, isobutyl propyl ketone, sec-butyl propyl ketone, pentyl propyl ketone, butyl propyl ketone, and the like.

Examples of an aromatic compound solvent include benzene, toluene, and xylene.

Examples of an aliphatic compound solvent include hexane, heptane, octane, decane, cyclohexane, cyclooctane, paraffin, gasoline, naphtha, kerosene, light oil, and the like.

Examples of a nitrile compound solvent include acetonitrile, propionitrile, isobutyronitrile, and the like.

Examples of the ester compound solvent include ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, isobutyl pivalate, and the like.

The total number of carbon atoms (simply referred to as the number of carbon atoms) in the compound that serves as the dispersion medium is not particularly limited. The dispersion medium is preferably a compound having 7 to 14 carbon atoms and more preferably a compound having 7 to 10 carbon atoms. As a compound having the above-described number of carbon atoms, the above-exemplified respective compounds having the corresponding number of carbon atoms are exemplified.

The dispersion medium preferably has a hydrocarbon group, and the hydrocarbon group more preferably has a branched structure or a cyclic structure. The hydrocarbon group needs to be a group formed of a carbon atom and a hydrogen atom, and a (cyclo)alkyl group, a (cyclo)alkenyl group, a (cyclo)alkynyl group, and the like are exemplified.

The number of the dispersion media (C) contained in the solid electrolyte composition may be one or more and is preferably two or more.

In a case in which the solid electrolyte composition of the embodiment of the present invention contains two or more dispersion media, two or more dispersion media selected from the group consisting of a hydrocarbon compound solvent, an ester compound solvent, an ether compound solvent, and a ketone compound solvent are preferred, and two or more dispersion media including at least one hydrocarbon compound solvent from the above-described group (which may be two or more hydrocarbon compound solvents) are more preferred.

The solid electrolyte composition of the embodiment of the present invention contains the dispersion medium. Therefore, dissolved oxygen and water in the dispersion medium (C) are contained in the solid electrolyte composition.

Since it is easy to set the amount of dissolved oxygen and the moisture content in the solid electrolyte composition of the embodiment of the present invention to the above-described ranges, a dispersion medium having an amount of dissolved oxygen and a moisture content that are set or adjusted in advance is preferably used.

The amount of dissolved oxygen in the dispersion medium (the total amount of dissolved oxygen in the case of using two or more dispersion media) is preferably 100 ppm or less, more preferably 50 ppm or less, still more preferably 20 ppm or less, and particularly preferably 1 ppm or less. The amount of dissolved oxygen in the dispersion medium can be measured using a method described in the examples described below. The amount of dissolved oxygen in the dispersion medium can be adjusted using a well-known method such as a method in which the dispersion medium is distilled away using benzophenone ketyl, a method in which the dispersion medium is irradiated with ultrasonic waves while being depressurized, a method in which the dispersion medium is substituted with inert gas (bubbling or purging), a deaeration treatment (for example, a method in which a degasser (deaeration device) is used or a freeze deaeration method) is used, or a method in which the dispersion medium is distilled away using a Na—K alloy. As the inert gas that is used in the method in which the dispersion medium is substituted with the inert gas, well-known inert gas can be used, and examples thereof include helium gas, neon gas, argon gas, nitrogen gas, and the like. This inert gas is preferably dried gas. Among the above-described methods for adjusting the amount of dissolved oxygen, the method in which the dispersion medium is substituted with the inert gas or the deaeration treatment is preferred. A deaerated dispersion medium can also be procured from commercially available products. Examples thereof include a variety of deoxidation solvents for organic synthesis (manufactured by Wako Pure Chemical Industries, Ltd. and the like).

The moisture content of the dispersion medium is preferably 100 ppm or less, more preferably 50 ppm or less, still more preferably 20 ppm or less, and most preferably 1 ppm or less.

The content of the dispersion medium in the solid electrolyte composition is not particularly limited, but is preferably 20% to 80% by mass, more preferably 30% to 70% by mass, and particularly preferably 40% to 60% by mass.

In the case of using two or more dispersion media including the hydrocarbon compound solvent, the content rate of the hydrocarbon compound solvent in the dispersion media is preferably 20% to 100% by mass and more preferably 50% to 95% by mass.

<(D) Active Material>

The solid electrolyte composition of the embodiment of the invention may also contain an active material (D) capable of intercalating and deintercalating ions of metal elements belonging to Group I or II of the periodic table.

As the active material, a positive electrode active material and a negative electrode active material are exemplified, and a metallic oxide (preferably a transition metal oxide) that is a positive electrode active material, a metallic oxide that is a negative electrode active material, or metal capable of forming an alloy with lithium such as Sn, Si, Al, or In is preferred.

In the present invention, the solid electrolyte composition containing the active material (a positive electrode active material or a negative electrode active material) will be referred to as a composition for an electrode (a composition for a positive electrode or a composition for a negative electrode).

(Positive Electrode Active Material)

A positive electrode active material that the solid electrolyte composition of the embodiment of the invention may contain is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the transition metal oxides having a bedded salt-type structure (MA) is preferred, and LCO or NMC is more preferred.

The shape of the positive electrode active material is not particularly limited, but is preferably a particle shape. The volume-average particle diameter (circle-equivalent average particle diameter) of positive electrode active material particles is not particularly limited. For example, the volume-average particle diameter can be set to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming a positive electrode active material layer, the mass (mg) of the positive electrode active material per unit area ($cm^2$) in the positive electrode active material layer (weight per unit area) is not particularly limited. The weight per unit area can be appropriately determined depending on a set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 55% to 80% by mass with respect to a solid content of 100% by mass.

(Negative Electrode Active Material)

A positive electrode active material that the solid electrolyte composition of the embodiment of the invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like.

Among these, carbonaceous materials or metal complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of absorbing a larger number of Li ions than a carbon negative electrode (graphite, acetylene black, or the like). That is, the amount of Li ions absorbed per unit mass increases. Therefore, it is possible to increase the battery capacity. As a result, there is an advantage that the battery driving duration can be extended.

The shape of the negative electrode active material is not particularly limited, but is preferably a particle shape. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a revolving airflow-type jet mill, a sieve, or the like is preferably used. During crushing, it is also possible to suitably carry out wet-type crushing in which water or an organic solvent such as methanol is made to coexist. In order to provide a desired particle diameter, classification is preferably carried out. The classification method is not particularly limited, and it is possible to suitably use a sieve, a wind power classifier, or the like. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited. The weight per unit area can be appropriately determined depending on a set battery capacity.

The content of the negative electrode active material in the solid electrolyte composition is not particularly limited, but is preferably 10% to 80% by mass and more preferably 20% to 80% by mass with respect to a solid content of 100% by mass.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium niobate-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

<Dispersant>

The solid electrolyte composition of the embodiment of the invention may also contain a dispersant. The addition of the dispersant enables the suppression of the agglomeration of the electrode active material and the inorganic solid electrolyte even in a case in which the content of any of the electrode active material and the inorganic solid electrolyte is high or a case in which the particle diameters are small and the surface area increases and the formation of a uniform active material layer and a uniform solid electrolyte layer. As the dispersant, a dispersant that is generally used for an all-solid state secondary battery can be appropriately selected and used. Generally, a compound intended for particle adsorption and steric repulsion and/or electrostatic repulsion is preferably used.

<Lithium Salt>

The solid electrolyte composition of the embodiment of the invention may also contain a lithium salt.

The lithium salt is not particularly limited, and, for example, the lithium salt described in Paragraphs 0082 to 0085 of JP2015-088486A is preferred.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

<Ionic Liquid>

The solid electrolyte composition of the embodiment of the invention may contain an ionic liquid in order to further improve the ion conductivity of individual layers constituting a solid electrolyte-containing sheet or an all-solid state secondary battery. The ionic liquid is not particularly limited, but is preferably an ionic liquid dissolving the above-described lithium salt from the viewpoint of effectively improving the ion conductivity. Examples thereof include compounds made of a combination of a cation and an anion described below.

(i) Cation

As the cation, an imidazolium cation, a pyridinium cation, a piperidinium cation, a pyrrolidinium cation, a morpholinium cation, a phosphonium cation, a quaternary ammonium cation, and the like are exemplified. Here, these cations have a substituent described below.

As the cation, these cations may be used singly or two or more cations can be used in combination.

A quaternary ammonium cation, a piperidinium cation, or a pyrrolidinium cation is preferred.

As the substituent that the cation has, an alkyl group (preferably an alkyl group having 1 to 8 carbon atoms and more preferably an alkyl group having 1 to 4 carbon atoms), a hydroxyalkyl group (preferably a hydroxyalkyl group having 1 to 3 carbon atoms), an alkyloxyalkyl group (an alkyloxyalkyl group having 2 to 8 carbon atoms is preferred, and an alkyloxyalkyl group having 2 to 4 carbon atoms is more preferred), an ether group, an allyl group, an aminoalkyl group (an aminoalkyl group having 1 to 8 carbon atoms is preferred, and an aminoalkyl group having 1 to 4 carbon atoms is more preferred), and an aryl group (an aryl group having 6 to 12 carbon atoms is preferred, and an aryl group having 6 to 8 carbon atoms is more preferred) are exemplified. The substituent may form a cyclic structure in a form of containing a cation site. The substituent may further have a substituent described in the section of the dispersion medium. Meanwhile, the ether group can be used in combination with other substituents. As such a substituent, an alkyloxy group, an aryloxy group, and the like are exemplified.

(ii) Anion

As the anion, a chloride ion, a bromide ion, an iodide ion, a boron tetrafluoride ion, a nitric acid ion, a dicyanamide ion, an acetic acid ion, an iron tetrachloride ion, a bis(trifluoromethanesulfonyl)imide ion, a bis(fluorosulfonyl)imide ion, a bis(perfluorobutylmethanesulfonyl)imide ion, an allylsulfonate ion, a hexafluorophosphate ion, a trifluoromethanesulfonate ion, and the like are exemplified.

As the anion, these anions may be used singly or two or more anions may also be used in combination.

A boron tetrafluoride ion, a bis(trifluoromethanesulfonyl) imide ion, a bis(fluorosulfonyl)imide ion or a hexafluorophosphate ion, a dicyanamide ion, and an allylsulfonate ion are preferred, and a bis(trifluoromethanesulfonyl)imide ion or a bis(fluorosulfonyl)imide ion and an allylsulfonate ion are more preferred.

As the ionic liquid, for example, 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, 1-ethyl-3-methylimidazolium bis(trifluoromethanesulfonyl)imide, 1-ethyl-3-methylimidazolium bis(fluorosulfonyl)imide, 1-ethyl-3-methylimidazolium dicyanamide, 1-butyl-1-methylpyrrolidinium bis(trifluoromethanesulfonyl)imide, trimethylbutylammonium bis(trifluoromethanesulfonyl)imide, N,N-diethyl-N-methyl-N-(2-methoxyethyl) ammonium bis (trifluoromethanesulfonyl)imide (DEME), N-propyl-N-methylpyrrolidinium bis(trifluoromethanesulfonyl)imide (PMP), N-(2-methoxyethyl)-N-methylpyrrolidinium tetrafluoroboride, 1-butyl-1-methylpyrrolidinium bis(fluorosulfonyl)imide, (2-acryloylethyl) trimethylammonium bis (trifluoromethanesulfonyl)imide, 1-ethyl-1-methylpyrrolidinium allyl sulfonate, 1-ethyl-3-methylimidazolium allylsulfonate, and trihexyltetradecylphosphonium chloride are exemplified.

The content of the ionic liquid in inorganic solid electrolyte is preferably 0 parts by mass or more, more preferably 1 part by mass or more, and most preferably 2 parts by mass or more with respect to 100 parts by mass of the solid content. The upper limit is preferably 50 parts by mass or less, more preferably 20 parts by mass or less, and particularly preferably 10 parts by mass or less.

The mass ratio between the lithium salt and the ionic liquid (the lithium salt:the ionic liquid) is preferably 1:20 to 20:1, more preferably 1:10 to 10:1, and most preferably 1:7 to 2:1.

<(E) Conductive Auxiliary Agent>

The solid electrolyte composition of the embodiment of the invention may also contain a conductive auxiliary agent. The conductive auxiliary agent is not particularly limited, and conductive auxiliary agents that are known as ordinary conductive auxiliary agents can be used.

The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, these conductive auxiliary agents may be used singly or two or more conductive auxiliary agents may be used.

In the present invention, in a case in which the active material and the conductive auxiliary agent are jointly used, among the above-described conductive auxiliary agents, a conductive auxiliary agent that does not intercalate and deintercalated ions of metals belonging to Group I or Group II of the periodic table and does not function as an active material at the time of charging and discharging a battery is regarded as the conductive auxiliary agent. Therefore, among the conductive auxiliary agents, a conductive auxiliary agent capable of functioning as the active material in the active material layer at the time of charging and discharging a battery is classified not into the conductive auxiliary agent but into the active material. Whether or not the conductive auxiliary agent functions as the active material at the time of charging and discharging a battery is not unambiguously determined but is determined by the combination with the active material.

The content of the conductive auxiliary agent in the solid electrolyte composition is preferably 0% to 5% by mass and more preferably 0.5% to 3% by mass with respect to 100 parts by mass of the solid content.

<(F) Oxygen Scavenger>

The solid electrolyte composition of the embodiment of the present invention preferably contains (F) an oxygen scavenger since it is possible to prevent an increase in the amount of dissolved oxygen over time and to maintain the high ion conductivity for a longer period of time.

The oxygen scavenger is not particularly limited as long as the oxygen scavenger physically adsorbs oxygen or is consumed by a chemical reaction, and examples thereof include sodium dithionite, iron powder, activated charcoal, and a mixture thereof. As these oxygen scavengers, it is possible to use a commercially available product, and examples thereof include, all as trade names, AGELESS (manufactured by Mitsubishi Gas Chemical Company, Inc.), WELL PACK (manufactured by TAISEI CO., LTD.), EVER FRESH (manufactured by Torishige Sangyo Co., Ltd.), OXY-EATER (manufactured by Ueno Fine Chemicals Industry, Ltd.), KEEPIT (manufactured by Dorency Co., Ltd.), KEPLON (manufactured by Keplon Co., Ltd.), SAN-SOCUT (manufactured by Irisfineproducts Co., Ltd.), SAN-SOLES (manufactured by Hakuyo, Inc.), SEQUL (manufactured by Nisso Fine Co., Ltd.), TAMOTSU (manufactured by Ohe Chemicals Inc.), VITALON (manufactured by Tokiwa Sangyo), MODULAN (manufactured by Food Techno), WONDERKEEP (manufactured by Powdertech), freshness preserving agent C (manufactured by Toppan Printing Co., Ltd.).

An aspect in which the solid electrolyte composition contains the oxygen scavenger is not particularly limited, and, in addition to an aspect in which the oxygen scavenger is uniformly dispersed (contained) in the solid electrolyte composition, an aspect in which the oxygen scavenger is locally present (scattered) in the solid electrolyte composition is also included.

In the present invention, the oxygen scavenger contained in the solid electrolyte composition is preferably removed at the time of using the solid electrolyte composition and used for drying or coating.

The content of the oxygen scavenger in the solid electrolyte composition is preferably 0% to 20% by mass and more preferably 0% to 5% by mass with respect to 100 parts by mass of the solid content.

<Preparation of Solid Electrolyte Composition>

The solid electrolyte composition of the embodiment of the present invention can be prepared by mixing the sulfide-based inorganic solid electrolyte (A), the binder (B), and other components as long as the action effect of the present invention is not impaired in the presence of the dispersion medium (C) using a variety of mixers. The solid electrolyte composition can be preferably prepared by dispersing the sulfide-based inorganic solid electrolyte (A), the binder (B), and other components as desired in the dispersion medium (C) to produce a slurry.

The slurry can be produced by mixing the sulfide-based inorganic solid electrolyte (A), the binder (B), the dispersion medium (C), and other components as desired using a variety of mixers. The mixer is not particularly limited, and examples thereof include a ball mill, a beads mill, a planetary mixer, a blade mixer, a roll mill, a kneader, and a disc mill. The mixing conditions are not particularly limited; however, in the case of using a ball mill, the inorganic solid electrolyte and the dispersion medium are preferably mixed together at 150 to 700 rpm (rotation per minute) for 1 to 24 hours.

The binder (B) may be mixed during the mixing of the sulfide-based inorganic solid electrolyte (A) and the dispersion medium (C) or may be separately mixed. In addition, in the case of preparing the solid electrolyte composition containing the active material (D) and a component such as a dispersant, the active material and the component may be mixed during the mixing of the sulfide-based inorganic solid electrolyte (A) and the dispersion medium (C) or may be separately mixed.

In a case in which the solid electrolyte composition prepared as described above satisfies the above-described amount of dissolved oxygen, there is no need for adjusting the amount of dissolved oxygen.

In a method for preparing the solid electrolyte composition, generally, the amount of dissolved oxygen is adjusted. A method for adjusting the amount of dissolved oxygen is not particularly limited, and a method in which dissolved oxygen is removed from a mixture of the sulfide-based solid electrolyte (A) and the dispersion medium (C), a method in which, as a component (generally dispersant) being used, a component having a previously decreased amount of dissolved oxygen is used, and the like are exemplified.

As a preferred method for preparing the solid electrolyte composition in which the amount of dissolved oxygen is in the above-described range (a method in which dissolved oxygen is removed from the mixture), a method including a step of mixing the sulfide-based solid electrolyte composition (A) and the dispersion medium (C) and a step of deoxidizing the obtained mixture to an amount of dissolved oxygen of 20 ppm or less is exemplified.

In this method, the mixing step can be carried out in the same manner as in the above-described formation of the slurry. Next, the obtained mixture is deoxidized. The deaeration of the mixture is not particularly limited as long as the deaeration is means capable of removing dissolved oxygen in the mixture, examples thereof include a method in which the mixture is irradiated with ultrasonic waves while being depressurized, a method in which the mixture is substituted with inert gas (bubbling or purging), a deaeration treatment (for example, a method in which a degasser (deaeration device) is used or a freeze deaeration method) is used, and the like, a method in which the mixture is substituted with inert gas and a deaeration treatment are preferred, and a method in which the mixture is substituted with inert gas is more preferred. As the inert gas that is used in the method in which the dispersion medium is substituted with the inert gas, well-known inert gas can be used, and examples thereof include helium gas, neon gas, argon gas, nitrogen gas, and the like. This inert gas is preferably dried gas. For the respective deoxidization described above, a well-known method can be employed, and conditions and the like thereof are also set to appropriate conditions as long as the amount of dissolved oxygen can be decreased. Furthermore, it is also possible to add a step of mixing the deoxidized mixture again. The solid electrolyte composition having an amount of dissolved oxygen of 20 ppm or less can be prepared by removing dissolved oxygen gas in the mixture in the above-described manner.

In this method, the binder (B) may be mixed together with the sulfide-based inorganic solid electrolyte (A) in the mixing step or may be mixed separately from the sulfide-based inorganic solid electrolyte (A) before or after the deoxidization step.

As another preferred method for preparing the solid electrolyte composition having an amount of dissolved oxygen in the above-described range (a method in which a component having a previously decreased amount of dissolved oxygen is used), a method including a step of mixing the sulfide-based inorganic solid electrolyte (A) and a dispersion medium (C1) deaerated to an amount of dissolved oxygen of 1 ppm or less in an inert gas atmosphere is exemplified.

As the dispersion medium (C1) deaerated to an amount of dissolved oxygen of 1 ppm or less, it is possible to use a dispersion medium having an amount of dissolved oxygen that has been decreased to 1 ppm using each of the adjustment methods described in the section of (C) the dispersion medium or a variety of deoxidation solvents for organic synthesis. This dispersant medium (C1) is preferably a dispersant that has been dehydrated or dried to have a moisture content in the above-described range.

In this method, the sulfide-based inorganic solid electrolyte (A) and the dispersion medium (C1) are mixed together in an inert gas atmosphere (generally, in an atmosphere having a low oxygen concentration, furthermore, a low-humidity atmosphere). The other mixing conditions and the like are not particularly limited, and the above-described conditions can be selected using a mixer. In addition, as described above, the binder (B) may be mixed together with the sulfide-based inorganic solid electrolyte (A) or separately mixed. Therefore, it is possible to prepare the solid electrolyte composition having an amount of dissolved oxygen of 20 ppm or less by preventing the intrusion of oxygen gas during preparation.

As still another preferred method for preparing the solid electrolyte composition having an amount of dissolved oxygen in the above-described range, a method in which dissolved oxygen is removed from a mixture prepared using a component having a previously decreased amount of dissolved oxygen is exemplified. In this method, it is possible to combine the above-described preferred methods.

<Solid Electrolyte Composition Kit>

A solid electrolyte composition kit of the embodiment of the present invention is a kit formed by combining the solid electrolyte composition of the embodiment of the present invention (first agent) and the oxygen scavenger (F) (second agent). The oxygen scavenger (F) in the solid electrolyte composition kit of the embodiment of the present invention is not contained in the solid electrolyte composition of the embodiment of the present invention and constitutes the kit as a separate independent chemical (second agent) or component. This oxygen scavenger (F) is not particularly limited and can be provided in a form of, for example, a liquid form, a sheet shape, a powder form, or a granular form. In a case in which the oxygen scavenger has a powder form or a granular form, the oxygen scavenger can also be provided in a form of being stored in an oxygen-transmitting film or exterior material.

The solid electrolyte composition kit of the embodiment of the present invention is preferably used in a storage method of a solid electrolyte composition described below. Therefore, this kit may include an airtight container or the like for storing the solid electrolyte composition.

A method for using this kit will be described in the section of the storage method of a solid electrolyte composition described below.

<Storage Method of Solid Electrolyte Composition>

The solid electrolyte composition is generally prepared or stored in an environment in which moisture is decreased (for example, in a dried air). In contrast, the storage method of a solid electrolyte composition of the embodiment of the present invention stores a solid electrolyte composition by maintaining the amount of dissolved oxygen in the solid electrolyte composition of the embodiment of the present invention to be at least 20 ppm or less or while decreasing the amount of dissolved oxygen. With the storage method of a solid electrolyte composition of the embodiment of the present invention, the high ion conductivity that the solid electrolyte composition of the embodiment of the present invention exhibits can be maintained for a long period of time without being decreased.

The storage method of a solid electrolyte composition is not particularly limited, and the following methods are exemplified.

(Method 1) A method in which the solid electrolyte composition of the embodiment of the present invention is stored in an inert gas atmosphere in a sealed environment.

(Method 2) A method in which the solid electrolyte composition of the embodiment of the present invention is stored after being impregnated with the oxygen scavenger (F).

(Method 3) A method in which the solid electrolyte composition of the embodiment of the present invention is stored together with the oxygen scavenger (F) in a sealed environment.

(Method 4) A method in which two or more of (1) to (3) are combined together.

A solid electrolyte composition that is used in the method 1 is the solid electrolyte composition of the embodiment of the present invention (a solid electrolyte composition in which the amount of dissolved oxygen is 20 ppm or less and the solid electrolyte composition of the embodiment of the present invention containing the oxygen scavenger (F)). However, dissolved oxygen in the solid electrolyte composition is deintercalated to the sealed environment, and the oxygen concentration (content) of the solid electrolyte composition and the oxygen concentration in the sealed environment reach equilibrium. Therefore, the solid electrolyte composition that is used in the method 1 is not limited to the solid electrolyte composition of the embodiment of the present invention, and, depending on the capacity of the sealed environment, a solid electrolyte composition having an amount of dissolved oxygen of more than 20 ppm can also be used. The inert gas is the same as the inert gas that is used in the method in which the dispersion medium or the mixture is substituted with an inert gas, and a preferred inert gas is also identical thereto.

The storage environment is not particularly limited as long as the storage environment is a sealed environment in an inert gas atmosphere, but is preferably a low-humidity environment (for example, relative humidity: 0.1% or less) or an environment in which the oxygen concentration is 20 ppm or less. The storage temperature or the like is appropriately set.

In the method 2, the solid electrolyte composition of the embodiment of the present invention and the oxygen scavenger (F) are used. Preferably, the solid electrolyte composition kit of the embodiment of the present invention having the oxygen scavenger (F) is used. The oxygen scavenger (F) is stored by impregnating the solid electrolyte composition of the embodiment of the present invention with the oxygen scavenger (F). The amount of the oxygen scavenger (F) impregnating the solid electrolyte composition cannot be generally determined and is appropriately determined depending on the amount of dissolved oxygen, the storage period, or the like. For example, the amount of the oxygen scavenger can be set to 1 part by mass with respect to 100 parts by mass of the solid electrolyte composition.

The storage environment is preferably a sealed environment, and the other conditions are not particularly limited, but a low-humidity environment or an environment in which the oxygen concentration is 20 ppm or less is preferred. The storage temperature or the like is appropriately set.

In the method 3, unlike the method 2, the solid electrolyte composition of the embodiment of the present invention and the oxygen scavenger (F) are made to coexist in a sealed environment as independent components. That is, in the method 3, the solid electrolyte composition of the embodiment of the present invention and the oxygen scavenger (F) are stored in a sealed environment in a physically contact or separate state. As a state in which the solid electrolyte composition and the oxygen scavenger (F) are physically in contact with each other, a state in which the oxygen scavenger is disposed on the surface of the solid electrolyte composition (a coated film state is included, but a state in which the oxygen scavenger impregnates to (permeates) the composition is not included) is exemplified.

In the method 3, the solid electrolyte composition kit of the embodiment of the present invention having the oxygen scavenger (F) is preferably used. The oxygen scavenger (F) included in the solid electrolyte composition kit of the embodiment of the present invention may have a liquid form, a powder form, or the like, and the form is appropriately set depending on the disposition state of the solid electrolyte composition and the oxygen scavenger (F). The solid electrolyte composition that is used in the method 3 is not limited to the solid electrolyte composition of the embodiment of the present invention, and, depending on the capacity of the sealed environment, a solid electrolyte composition having an amount of dissolved oxygen of more than 20 ppm can also be used.

The storage environment is not particularly limited as long as the storage environment is a sealed environment, and a low-humidity environment or an environment in which the oxygen concentration is 20 ppm or less is preferred. The storage temperature or the like is appropriately set.

In the method 4, the combination of the methods 1 to 3 is not particularly limited and can be appropriately determined. For example, it is possible to combine the method 1 and the method 3.

[Sheet for all-Solid State Secondary Battery]

A solid electrolyte-containing sheet of the embodiment of the present invention is a sheet having a layer made of a solid electrolyte composition, in which the amount (volume proportion) of dissolved oxygen included in a pore in the solid electrolyte-containing sheet (particularly, the layer made of a solid electrolyte composition) is 20 ppm or less. The layer made of a solid electrolyte composition contains the sulfide-based solid electrolyte (A), the binder (B), and, appropriately, the other components as long as the action effect of the present invention is not impaired. This layer may be made of a well-known solid electrolyte composition as long as the amount of dissolved oxygen is 20 ppm or less, but is preferably made of the solid electrolyte composition of the embodiment of the present invention.

The amount of dissolved oxygen in the pore in this solid electrolyte-containing sheet (hereinafter, referred to as the amount of dissolved oxygen in the solid electrolyte-containing sheet in some cases) is 20 ppm or less. In a case in which the amount of dissolved oxygen in the pore is 20 ppm or less, it is possible to suppress the above-described slowly-progressing deterioration that is unique to sulfide-based solid electrolytes. The amount of dissolved oxygen in the solid electrolyte-containing sheet is preferably the same amount of dissolved oxygen as the amount of dissolved oxygen in the solid electrolyte composition of the embodiment of the present invention since the solid electrolyte-containing sheet exhibits high temporal stability regarding ion conductivity.

In the present invention, the amount of dissolved oxygen in the solid electrolyte-containing sheet exhibits the amount of oxygen gas dissolved (contained) in the pore in the solid electrolyte-containing sheet and specifically refers to a value measured using a method described in the examples described below.

Similar to the solid electrolyte composition, the amount of dissolved oxygen in the solid electrolyte-containing sheet may be a value measured at any point in time, but is generally a value measured after the production of the solid electrolyte-containing sheet.

A method for setting or adjusting the amount of dissolved oxygen in the solid electrolyte-containing sheet to the above-described range is not particularly limited, and it is possible to appropriately employ the method exemplified in the section of the method for adjusting the solid electrolyte composition.

In the solid electrolyte-containing sheet of the embodiment of the present invention, the moisture content (mass proportion) is preferably 50 ppm or less, more preferably 20 ppm or less, still more preferably 10 ppm or less, and particularly preferably 5 ppm or less. In a case in which the moisture content of the solid electrolyte-containing sheet is small, it is possible to suppress the deterioration of the sulfide-based solid electrolyte by water. Therefore, this solid electrolyte-containing sheet exhibits a high ion conductivity and can be used to manufacture an all-solid state secondary battery having excellent battery performance by being used as a layer-constituting material of the all-solid state secondary battery.

This moisture content refers to the amount of water being contained in the solid electrolyte-containing sheet and is, specifically, a value measured using a method described in the examples described below.

The solid electrolyte-containing sheet of the embodiment of the invention can be preferably used in all-solid state secondary batteries and is modified in a variety of aspects depending on the uses. Examples thereof include a sheet that is preferably used in a solid electrolyte layer (also referred to as a solid electrolyte-containing sheet for an all-solid state secondary battery), a sheet that is preferably used in an electrode or a laminate of an electrode and a solid electrolyte layer (an electrode sheet for an all-solid state secondary battery), and the like. In the present invention, a variety of sheets described above will be collectively referred to as a sheet for an all-solid state secondary battery in some cases.

The sheet for an all-solid state secondary battery needs to be a sheet having a solid electrolyte layer or an active material layer (electrode layer) and may be a sheet having a solid electrolyte layer or an active material layer (electrode layer) formed on a base material or a sheet formed of a solid electrolyte layer or an active material layer (electrode layer) without having a base material. Hereinafter, a sheet in an aspect of having a solid electrolyte layer or an active material layer (electrode layer) on a base material will be described in detail as an example.

This sheet for an all-solid state secondary battery may further have other layers as long as the sheet has the base material, the solid electrolyte layer or the active material layer, but a sheet containing an active material is classified into an electrode sheet for an all-solid state secondary battery described below. Examples of other layers include a protective layer, a collector, a coating layer (a collector, a solid electrolyte layer, or an active material layer), and the like.

Examples of the solid electrolyte-containing sheet for an all-solid state secondary battery include a sheet having a solid electrolyte layer and a protective layer on a base material in this order and a sheet made of a solid electrolyte layer or an active material layer (electrode layer) (a sheet not having a base material).

The base material is not particularly limited as long as the base material is capable of supporting the solid electrolyte layer or the active material layer, and examples thereof include sheet bodies (plate-like bodies) of materials, organic materials, inorganic materials, and the like described in the section of the collector described below. Examples of the organic materials include a variety of polymers and the like, and specific examples thereof include polyethylene terephthalate, polypropylene, polyethylene, cellulose, and the like. Examples of the inorganic materials include glass, ceramic, and the like.

The layer thickness of the solid electrolyte layer in the sheet for an all-solid state secondary battery is identical to the layer thickness of the solid electrolyte layer described in the section of an all-solid state secondary battery of the embodiment of the invention.

This sheet is obtained by forming a film of the solid electrolyte composition of the embodiment of the invention (by means of application and drying) on the base material (possibly, through other layers) and forming a solid electrolyte layer on the base material. The sheet for an all-solid state secondary battery may be a sheet made of a solid electrolyte layer peeled off from the base material.

Here, the solid electrolyte composition of the embodiment of the invention can be prepared using the above-described method.

An electrode sheet for an all-solid state secondary battery of the embodiment of the invention (also simply referred to as "the electrode sheet") is a sheet for forming an active material layer in an all-solid state secondary battery of the embodiment of the invention and preferably an electrode sheet having an active material layer on a metal foil as a collector. This electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet.

The layer thicknesses of the respective layers constituting the electrode sheet are identical to the layer thicknesses of individual layers described in the section of an all-solid state secondary battery of the embodiment of the invention.

The electrode sheet is obtained by forming a film of the solid electrolyte composition of the embodiment of the invention which contains the active material (by means of application and drying) on the metal foil and forming an active material layer on the metal foil. A method for preparing the solid electrolyte composition containing the active material is the same as the method for preparing the solid electrolyte composition except for the fact that the active material is used.

A method for producing the solid electrolyte-containing sheet of the embodiment of the present invention will be described below together with a method for manufacturing the all-solid state secondary battery of the embodiment of the present invention.

<Solid Electrolyte-Containing Sheet Kit>

A solid electrolyte-containing sheet kit of the embodiment of the present invention is a kit formed by combining the solid electrolyte-containing sheet of the embodiment of the present invention and the oxygen scavenger (F). The oxygen scavenger (F) in the solid electrolyte-containing sheet kit of the embodiment of the present invention is not contained in the solid electrolyte composition of the embodiment of the present invention and constitutes the kit as a separate independent chemical (second agent) or component. This oxygen scavenger (F) is not particularly limited, can be provided in a form of, for example, a liquid form, a sheet shape, a powder form, or a granular form, and, in a case in which the oxygen scavenger has a powder form or a granular form, can also be provided in a form in which the oxygen scavenger is stored in an oxygen-transmitting film or exterior material.

The solid electrolyte-containing sheet kit of the embodiment of the present invention is preferably used in a storage method of a solid electrolyte-containing sheet described below. Therefore, this kit may include an airtight container or the like for storing the solid electrolyte-containing sheet. A method for using this kit will be described in the section of the storage method of a solid electrolyte-containing sheet described below.

<Storage Method of Solid Electrolyte-Containing Sheet>

The solid electrolyte-containing sheet is generally prepared or stored in an environment in which moisture is decreased (for example, in a dried air). In contrast, the storage method of a solid electrolyte-containing sheet of the embodiment of the present invention stores a solid electrolyte composition by maintaining the amount of dissolved oxygen in the solid electrolyte-containing sheet of the embodiment of the present invention to be at least 20 ppm or less or while decreasing the amount of dissolved oxygen. With the storage method of a solid electrolyte-containing sheet of the embodiment of the present invention, the high ion conductivity that the solid electrolyte-containing sheet of the embodiment of the present invention exhibits can be maintained for a long period of time without being decreased.

The storage method of a solid electrolyte-containing sheet is not particularly limited, and, in addition to the method for storing the solid electrolyte-containing sheet in a sealed environment having an oxygen concentration of 20 ppm or less, the same method as the storage method of a solid electrolyte composition of the embodiment of the present invention except for the fact that the solid electrolyte-containing sheet is used instead of the solid electrolyte composition is exemplified. Among them, similar to the method 3, a method for storing the solid electrolyte-containing sheet in a sealed environment in the presence of the oxygen scavenger (F) using the solid electrolyte-containing sheet kit.

[All-Solid State Secondary Battery]

An all-solid state secondary battery of the embodiment of the invention has a positive electrode, a negative electrode facing the positive electrode, and a solid electrolyte layer between the positive electrode and the negative electrode. The positive electrode preferably has a positive electrode active material layer on a positive electrode collector. The negative electrode preferably has a negative electrode active material layer on a negative electrode collector.

At least one layer of the negative electrode active material layer, the positive electrode active material layer, and the solid electrolyte layer is formed using the solid electrolyte composition of the embodiment of the present invention or the solid electrolyte-containing sheet of the embodiment of the present invention. Therefore, in the layer formed of the solid electrolyte composition of the embodiment of the present invention or the solid electrolyte-containing sheet of the embodiment of the present invention, the oxygen concentration is 20 ppm or less. Therefore, the all-solid state secondary battery exhibits excellent battery characteristics for a long period of time.

In the active material layer and/or the solid electrolyte layer formed of the solid electrolyte composition or the solid electrolyte-containing sheet, the kinds of the component being contained and contents thereof are preferably the same as the solid content of the solid electrolyte composition or the solid electrolyte-containing sheet.

Hereinafter, the all-solid state secondary battery of the preferred embodiments of the present invention will be described with reference to FIG. 1, but the present invention is not limited thereto.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons (e⁻) are supplied to the negative electrode side, and lithium ions (Li⁺) are accumulated on the negative electrode side. On the other hand, during discharging, the lithium ions (Li⁺) accumulated on the negative electrode side return to the positive electrode, and electrons are supplied to an operation portion 6. In an example illustrated in the drawing, an electric bulb is employed as the operation portion 6 and is lit by discharging.

A solid electrolyte composition of the embodiment of the invention can be preferably used as a material used to form the negative electrode active material layer, the positive electrode active material layer, and the solid electrolyte layer. In addition, a solid electrolyte-containing sheet of the embodiment of the invention is preferred as the negative electrode active material layer, the positive electrode active material layer, and the solid electrolyte layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

Meanwhile, in a case in which an all-solid state secondary battery having the layer constitution shown in FIG. 1 is put into a 2032-type coin case, the all-solid state secondary battery having the layer constitution shown in FIG. 1 will be referred to as the electrode sheet for an all-solid state secondary battery, and a battery produced by putting this electrode sheet for an all-solid state secondary battery into the 2032-type coin case will be referred to as the all-solid state secondary battery, thereby referring to both batteries distinctively in some cases.

(Positive Electrode Active Material Layer, Solid Electrolyte Layer, and Negative Electrode Active Material Layer)

In the all-solid state secondary battery 10, any of the positive electrode active material layer, the solid electrolyte layer, or the negative electrode active material layer is formed using the solid electrolyte composition of the embodiment of the present invention or the solid electrolyte-containing sheet of the embodiment of the present invention.

That is, in a case in which the solid electrolyte layer 3 is formed of the solid electrolyte composition of the embodiment of the present invention or the solid electrolyte-containing sheet of the embodiment of the present invention, the solid electrolyte layer 3 includes the inorganic solid electrolyte (A) and the binder (B) and has an amount of dissolved oxygen of 20 ppm or less. Therefore, the all-solid state secondary battery exhibits excellent battery characteristics for a long period of time. The solid electrolyte layer, generally, does not include any positive electrode active material and/or any negative electrode active material.

In a case in which the positive electrode active material layer 4 and/or the negative electrode active material layer 2 are formed of the solid electrolyte composition of the embodiment of the present invention or the solid electrolyte-containing sheet of the embodiment of the present invention, the positive electrode active material layer 4 and the negative electrode active material layer 2 respectively include the positive electrode active material or the negative electrode active material, and the inorganic solid electrolyte (A) and the binder (B) and have an amount of dissolved oxygen of 20 ppm or less. Therefore, the all-solid state secondary battery exhibits excellent battery characteristics for a long period of time.

The kinds of the inorganic solid electrolyte (A) and the binder (B) that the positive electrode active material layer 4, the solid electrolyte layer 3, and the negative electrode active material layer 2 contain may be identical to or different from each other.

In the present invention, any layer of the negative electrode active material layer, the positive electrode active material layer, and the solid electrolyte layer in the all-solid state secondary battery are produced using the solid electrolyte composition of the embodiment of the present invention or the solid electrolyte-containing sheet of the embodiment of the present invention.

In the present invention, one preferred aspect is that all of the negative electrode active material layer, the positive electrode active material layer, and the solid electrolyte layer in the all-solid state secondary battery are produced using the solid electrolyte composition of the embodiment of the present invention or the solid electrolyte-containing sheet of the embodiment of the present invention.

The thicknesses of the positive electrode active material layer 4, the solid electrolyte layer 3, and the negative electrode active material layer 2 are not particularly limited. In the case of taking an ordinary dimension of a battery into account, the thicknesses of the respective layers are respectively preferably 10 to 1,000 μm and more preferably 20 μm or more and less than 5,000 μm. In the all-solid state secondary battery of the embodiment of the invention, the thickness of at least one layer of the positive electrode active material layer 4, the solid electrolyte layer 3, or the negative electrode active material layer 2 is still more preferably 50 μm or more and less than 500 μm.

(Collector (Metal Foil))

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be composed of a single layer or multiple layers.

(Chassis)

It is possible to produce the basic structure of the all-solid state secondary battery by disposing the respective layers described above. Depending on the use, the basic structure may be directly used as an all-solid state secondary battery, but the basic structure may be used after being enclosed in an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

[Manufacturing of Solid Electrolyte-Containing Sheet]

The solid electrolyte-containing sheet of the embodiment of the invention is obtained, for example, by forming a film of the solid electrolyte composition of the embodiment of the invention on a base material (possibly, through a different layer) (application and drying) and forming a solid electrolyte layer or an active material layer (application drying layer) on the base material. Therefore, it is possible to produce a sheet for an all-solid state secondary battery that is a sheet having a base material and an applied dried layer. In addition, it is also possible to produce a solid electrolyte-containing sheet made of the solid electrolyte layer by peeling the base material off from the produced solid electrolyte-containing sheet. Here, the applied dried layer refers to a layer formed by applying the solid electrolyte composition of the embodiment of the present invention and drying the dispersion medium (that is, a layer formed using the solid electrolyte composition of the embodiment of the present invention and removing the dispersion solvent from the solid electrolyte composition of the embodiment of the present invention).

Additionally, regarding steps such as application, it is possible to use a method described in the following section of the manufacturing of an all-solid state secondary battery.

In a case in which the solid electrolyte-containing sheet prepared as described above satisfies the above-described amount of dissolved oxygen, there is no need for adjusting the amount of dissolved oxygen. In a method for manufacturing the solid electrolyte-containing sheet, generally, the amount of dissolved oxygen is adjusted. A method for adjusting the amount of dissolved oxygen is not particularly limited, and a method in which the solid electrolyte composition of the embodiment of the present invention is used is exemplified.

Meanwhile, the solid electrolyte-containing sheet may also contain a dispersion medium in each layer as long as the battery performance is not affected. Specifically, the content of the dispersion medium in each layer may be 1 ppm or more and 10,000 ppm or less of the total mass. The content proportion of the dispersion medium (C) in the solid electrolyte-containing sheet of the embodiment of the invention can be measured using the following method. A 20 mm×20 mm specimen was cut out from the solid electrolyte-containing sheet by punching and immersed in heavy tetrahydrofuran in a glass bottle. The obtained eluted substance is filtered using a syringe filter, and a quantitative operation by $^1$H-NMR is carried out. The correlation between the $^1$H-NMR peak surface area and the amount of the solvent is obtained by producing a calibration curve.

[All-Solid State Secondary Battery and Manufacturing of Electrode Sheet for all-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the embodiment of the invention or the like. Therefore, it is possible to manufacture an all-solid state secondary battery and an electrode sheet for an all-solid state secondary battery which stably exhibit excellent battery characteristics for a long period of time. Hereinafter, the manufacturing of the all-solid state secondary battery and the electrode sheet for an all-solid state secondary battery will be described in detail.

The all-solid state secondary battery of the embodiment of the invention can be manufactured using a method including (through) a step of applying the solid electrolyte composition of the embodiment of the invention onto a base material (for example, a metal foil which serves as a collector) and forming a coated film (film manufacturing).

For example, a solid electrolyte composition containing a positive electrode active material is applied as a material for a positive electrode (a composition for a positive electrode) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be produced by suitably enclosing the all-solid state secondary battery in a chassis.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte-containing sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte-containing sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

<Formation of Individual Layers (Formation of Films)>

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent total performance is exhibited, and it is possible to obtain a favorable binding property.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the applied solvent or dispersion medium has been dried in advance or in a state in which the solvent or the dispersion medium remains.

Meanwhile, the respective compositions may be applied at the same time, and the application, the drying, and the pressing may be carried out simultaneously and/or sequentially.

The respective compositions may be applied to separate base materials and then laminated by means of transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the same portion with a pressure that varies stepwise.

A pressing surface may be flat or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery of the embodiment of the invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include vehicles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

All-solid state secondary batteries refer to secondary batteries having a positive electrode, a negative electrode, and an electrolyte which are all composed of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S-based glass, LLT, LLZ, or the like is used. Meanwhile, the application of organic compounds to inorganic all-solid state secondary batteries is not inhibited, and organic compounds can also be applied as binders or additives of positive electrode active materials, negative electrode active materials, and inorganic solid electrolytes.

Inorganic solid electrolytes are differentiated from electrolytes in which the above-described polymer compound is used as an ion conductive medium (polymer electrolyte), and inorganic compounds serve as ion conductive media. Specific examples thereof include the Li—P—S glass, LLT, or LLZ. Inorganic solid electrolytes do not deintercalate positive ions (Li ions) and exhibit an ion transportation function. In contrast, there are cases in which materials serving as an ion supply source which is added to electrolytic solutions or solid electrolyte layers and deintercalates positive ions (Li ions) are referred to as electrolytes. However, in the case of being differentiated from electrolytes as the ion transportation materials, the materials are referred to as "electrolyte salts" or "supporting electrolytes". Examples of the electrolyte salts include LiTFSI.

In the present invention, "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described. In addition, "room temperature" refers to 25° C.

Example 1

In Example 1, a solid electrolyte composition was prepared, and the initial ion conductivity and the temporal stability of the ion conductivity were evaluated.

<Synthesis of Sulfide-Based Inorganic Solid Electrolyte>

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using an agate muddler for five minutes. The mixing ratio between $Li_2S$ and $P_2S_5$ was set to 75:25 in terms of molar ratio.

Sixty six zirconia beads having a diameter of 5 mm were injected into a 45 mL zirconia container (manufactured by Fritsch Japan Co., Ltd.), the total amount of the mixture of the lithium sulfide and the diphosphorus pentasulfide was injected thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide-based inorganic solid electrolyte (Li—P—S-based glass). The volume-average particle diameter was 15 μm.

<Preparation of Solid Electrolyte Composition>

(Preparation of Solid Electrolyte Composition S-1)

A solid electrolyte composition S-1 was prepared using the above-described method in which dissolved oxygen was removed from a mixture prepared using a component having a previously decreased amount of dissolved oxygen.

Fifty zirconia beads having a diameter of 3 mm were injected into a 45 mL zirconia container (manufactured by Fritsch Japan Co., Ltd.), sulfide-based inorganic solid electrolyte Li—P—S-based glass (1.5 g) and a binder (B-1) (0.020 g) were added thereto, and tetrahydrofuran (THF, amount of dissolved oxygen: 50 ppm, moisture content: 100 ppm) (5.3 g) was injected thereinto as a dispersion medium (mixing step). After that, a bubbling treatment was carried out using dried argon for five minutes (deoxidization step), and the container was filled with argon gas. The container was set in a planetary ball mill P-7 (trade name, manufactured by Fritsch Japan Co., Ltd.), and the components were continuously mixed together at a temperature of 25° C. and a rotation speed of 300 rpm for two hours (re-mixing step), thereby preparing a solid electrolyte composition S-1.

(Preparation of Solid Electrolyte Compositions S-2, S-8, S-11 to S-13, and S-18)

Solid electrolyte compositions S-2, S-8, S-11 to S-13, and S-18 were prepared respectively in the same manner as in the preparation of the solid electrolyte composition S-1 except for the fact that, in the preparation of the solid electrolyte composition S-1, the composition was changed to a composition shown in Table 1.

(Preparation of Solid Electrolyte Compositions S-3 to S-7, S-9, S-10, S-14 to S-17, and S-19)

Solid electrolyte compositions S-3 to S-7, S-9, S-10, S-14 to S-17, and S-19 were prepared using the above-described method in which a component having a previously decreased amount of dissolved oxygen was used.

The solid electrolyte compositions S-3 to S-7, S-9, S-10, S-14 to S-17, and S-19 were prepared respectively in the same manner as in the preparation of the solid electrolyte composition S-1 except for the fact that, in the preparation of the solid electrolyte composition S-1, the composition was changed to a composition shown in Table 1 and the respective components were mixed together using a dispersion medium (C1) having a previously decreased amount of dissolved oxygen by filling the container with dried air, nitrogen gas, or argon gas without carrying out the bubbling treatment in which dried argon was used (mixing step).

(Preparation of Solid Electrolyte Compositions T-1 to T-4)

Solid electrolyte compositions T-1 to T-4 were prepared respectively in the same manner as in the preparation of the solid electrolyte composition S-3 except for the fact that, in the preparation of the solid electrolyte composition S-3, the composition was changed to a composition shown in Table 1.

(Preparation of Solid Electrolyte Composition T-5)

A solid electrolyte composition T-5 was prepared in the same manner as in the preparation of the solid electrolyte composition S-1 except for the fact that, in the preparation of the solid electrolyte composition S-1, the composition was changed to a composition shown in Table 1.

<Measurement of Amount of Dissolved Oxygen in Solid Electrolyte Composition>

The respective solid electrolyte compositions obtained above were filtrated using a 0.02 μm membrane filter, and the amounts of dissolved oxygen in the obtained filtrates were measured using a dissolved oxygen concentration measurement meter (DO meter): explosion-proof portable oxygen analyzer 3650EX (manufactured by HACH). As the amount of dissolved oxygen, a value measured after one minute elapsed from the beginning of the measurement was used. The results are shown in Table 1.

<Moisture Content in Solid Electrolyte Composition>

The respective solid electrolyte compositions obtained above were filtrated using a 0.02 μm membrane filter, and the moisture contents were obtained using Karl Fischer titration. The results are shown in Table 1.

<Storage of Solid Electrolyte Composition>

Each of the produced solid electrolyte compositions (slurries) was put into a glass sample bottle with a non-oxygen-transmitting screw cock lid (manufactured by Maruemu Corporation) in a dried air (dew point: −70° C.) and stored at 25° C. for four weeks using the oxygen scavenger (F). In the "storage method" column in Table 1, a storage method "A" is shown in a case in which the solid electrolyte composition was immersed in a solution of the oxygen scavenger (solvent: toluene, amount of dissolved oxygen: 1 ppm, moisture content: 1 ppm), and a storage method "B" is shown in a case in which the oxygen scavenger was attached to the lid. As the oxygen scavenger, AGELESS (trade name, manufactured by Mitsubishi Gas Chemical Company, Inc.) (0.5 g) was stored in a back and used.

In a storage method for which "-" is shown in the "storage method" column in Table 1, the sulfide-based solid electrolyte composition (slurry) was stored in an argon atmosphere at 25° C. for four weeks without using the oxygen scavenger (F).

In all of the solid electrolyte compositions S-1 to S-19 after stored, the amounts of dissolved oxygen were 20 ppm.

<Measurement of Ion Conductivity>

For the solid electrolyte compositions immediately after prepared and the solid electrolyte compositions after stored, a coin-type jig shown in FIG. 2 was produced and the ion conductivity was measured as described below. The results are shown in Table 1.

(Measurement of Initial Ion Conductivity)

Each of the solid electrolyte compositions (slurries) immediately after prepared (before stored) was applied onto an aluminum foil (film thickness: 20 μm) by means of bar coating at a clearance of 300 μm in a dried air having a dew point of −60° C. and dried on a hot plate heated to 100° C. at a normal pressure for two hours. A solid electrolyte-containing sheet having a solid electrolyte layer having a film thickness of 100 μm was obtained in the above-described manner. Two 13.5 mmϕ disc-shaped pieces were cut out from the obtained solid electrolyte-containing sheet, the applied surfaces (the surfaces of the solid electrolyte layers) thereof were overlapped with each other to produce a solid electrolyte-containing sheet 15 in which the solid electrolyte layer had a film thickness of 200 μm, and the ion conductivity was measured using an impedance method.

The solid electrolyte-containing sheet 15 having the overlapped applied surfaces was plugged into a cylindrical case 14 having a diameter of 14.5 mm, and a spacer and a washer (both not illustrated in FIG. 2) were combined to each other, thereby producing a coin-type jig 13. From the outside of the coin-type jig 13, the coin-type jig 13 was inserted into a jig capable of applying a pressure of 49 MPa between electrodes and used for the measurement of the ion conductivity.

The ion conductivity in a pressurized (at 49 MPa) state was obtained in a constant-temperature tank (30° C.) using the coin-type holding device 13 obtained above by an alternating-current impedance method. At this time, a test body shown in FIG. 2 was used for the pressurization of the coin-type holding device 13. A reference 11 indicates an upper portion-supporting plate, a reference 12 indicates a lower portion-supporting plate, a reference 13 indicates a coin-type holding device, and a reference S indicate a screw.

$$\text{Ion conductivity(mS/cm)}=1000\times\text{specimen film thickness(cm)}/(\text{resistance}(\Omega)\times\text{specimen area(cm}^2)) \quad \text{Expression (1)}$$

In Expression (1), the film thickness of the specimen and the area of the specimen are values measured before the solid electrolyte-containing sheet 15 was put into the 2032-type cylindrical case 14.

<Temporal Confirmation of Ion Conductivity>

For each of the solid electrolyte compositions after stored, the ion conductivity after storage was measured in the same manner as the measurement of the initial ion conductivity. The retention of the ion conductivity was computed from the initial ion conductivity and the ion conductivity after storage using the following expression.

$$\text{Retention of ion conductivity (\%)}=(\text{ion conductivity after storage/initial ion conductivity})\times 100$$

Evaluation was determined by which of the following evaluation ranks the computed retention was included.

In the present test, the retention of the ion conductivity with an evaluation rank of "C" or higher is pass.

—Evaluation Ranks—

A: The retention of the ion conductivity is more than 95% and 100% or less.
B: The retention of the ion conductivity is more than 90% and 95% or less.
C: The retention of the ion conductivity is more than 80% and 90% or less.
D: The retention of the ion conductivity is more than 50% and 80% or less.
E: The retention of the ion conductivity is 50% or less.

TABLE 1

| Solid electrolyte composition | Sulfide-based solid electrolyte (A) | | Binder (B) | | Dispersion medium (C) | | | |
|---|---|---|---|---|---|---|---|---|
| | Kind | Parts by mass | Kind | Parts by mass | Kind | Amount of dissolved oxygen (ppm) | Moisture content (ppm) | Parts by mass |
| S-1 | Li—P—S | 1.5 | B-1 | 0.020 | THF | 50 | 100 | 5.3 |
| S-2 | Li—P—S | 1.5 | B-3 | 0.040 | THF | 25 | 70 | 3.6 |
| S-3 | Li—P—S | 1.5 | B-4 | 0.040 | Hexane | 20 | 50 | 3.6 |
| S-4 | Li—P—S | 1.5 | B-1 | 0.040 | Toluene | 5 | 20 | 5.3 |
| S-5 | Li—P—S | 1.5 | B-2 | 0.040 | Hexane | 2 | 20 | 5.3 |
| S-6 | Li—P—S | 1.5 | B-4 | 0.040 | THF | 1 | 10 | 5.3 |
| S-7 | Li—P—S | 1.5 | B-5 | 0.040 | THF | 1 | 5 | 5.3 |
| S-8 | Li—P—S | 1.5 | B-4 | 0.040 | Hexane | 50 | 5 | 5.3 |
| S-9 | Li—P—S | 1.5 | B-5 | 0.040 | Hexane | 1 | 5 | 5.3 |
| S-10 | Li—P—S | 1.5 | B-4 | 0.040 | Hexane/THF (90/10) | 1 | 5 | 5.3 |
| S-11 | Li—P—S | 1.5 | B-5 | 0.040 | Heptane | 1 | 5 | 5.3 |
| S-12 | Li—P—S | 1.5 | B-4 | 0.040 | Hexane/THF (80/20) | 1 | 5 | 5.3 |
| S-13 | Li—P—S | 1.5 | B-5 | 0.040 | Hexane/THF (90/10) | 1 | 5 | 5.3 |
| S-14 | Li—P—S | 1.5 | B-5 | 0.040 | n-Butyl butyrate | 1 | 5 | 5.3 |
| S-15 | Li—P—S | 1.5 | B-5 | 0.040 | Diisobutyl ketone | 1 | 5 | 5.3 |
| S-16 | Li—P—S | 1.5 | B-5 | 0.040 | Octane/n-butyl butyrate (70/30) | 1 | 5 | 5.3 |
| S-17 | Li—P—S | 1.5 | B-5 | 0.040 | Propyl laurate | 1 | 5 | 5.3 |
| S-18 | Li—P—S | 1.5 | B-1 | 0.020 | THF | 50 | 100 | 5.3 |
| S-19 | Li—P—S | 1.5 | B-1 | 0.020 | Isobutyl isobutyrate | 1 | 5 | 5.3 |
| T-1 | Li—P—S | 1.5 | B-1 | 0.040 | THF | 2,000 | 1,000 | 5.3 |
| T-2 | Li—P—S | 1.5 | B-2 | 0.040 | Heptane | 2,000 | 100 | 5.3 |
| T-3 | Li—P—S | 1.5 | B-2 | 0.040 | n-Butyl butyrate | 1,500 | 20 | 5.3 |
| T-4 | Li—P—S | 1.5 | B-5 | 0.040 | n-Butyl butyrate | 200 | 20 | 5.3 |
| T-5 | Li—P—S | 1.5 | B-1 | 0.020 | THF | 50 | 100 | 5.3 |

| Solid electrolyte composition | Deaeration treatment | Dispersion atmosphere | Storage method | Evaluation | | | |
|---|---|---|---|---|---|---|---|
| | | | | Amount of dissolved oxygen (ppm) | Moisture content (ppm) | Initial ion conductivity (mS/cm) | Retention of the ion conductivity |
| S-1 | Ar bubbling | Ar | — | 20 | 80 | 0.132 | C |
| S-2 | Ar bubbling | Ar | — | 15 | 70 | 0.211 | B |
| S-3 | No | dryAir | — | 20 | 50 | 0.353 | B |
| S-4 | No | dryAir | — | 10 | 20 | 0.386 | B |
| S-5 | No | dryAir | — | 10 | 20 | 0.410 | B |
| S-6 | No | dryAir | A | 5 | 10 | 0.389 | A |
| S-7 | No | dryAir | A | 5 | 10 | 0.378 | A |
| S-8 | Ar bubbling | Ar | — | 5 | 10 | 0.452 | A |
| S-9 | No | dryAir | — | 10 | 15 | 0.432 | B |
| S-10 | No | $N_2$ | B | 10 | 10 | 0.467 | A |
| S-11 | Ar bubbling | Ar | — | 1 | 5 | 0.453 | A |
| S-12 | Ar bubbling | Ar | A | 1 | 5 | 0.476 | A |
| S-13 | Ar bubbling | Ar | B | 1 | 5 | 0.478 | A |
| S-14 | No | $N_2$ | B | 5 | 5 | 0.433 | A |
| S-15 | No | Ar | — | 5 | 5 | 0.412 | A |
| S-16 | No | Ar | B | 5 | 5 | 0.452 | A |
| S-17 | No | Ar | — | 5 | 5 | 0.395 | B |
| S-18 | Ar bubbling | Ar | B | 20 | 80 | 0.132 | B |
| S-19 | No | $N_2$ | B | 20 | 80 | 0.506 | A |
| T-1 | No | dryAir | — | 2,000 | 200 | 0.043 | E |
| T-2 | No | dryAir | — | 2,000 | 5 | 0.410 | E |
| T-3 | No | dryAir | — | 1,500 | 5 | 0.402 | E |
| T-4 | No | dryAir | — | 200 | 5 | 0.421 | D |
| T-5 | Ar bubbling | Ar | — | 30 | 80 | 0.129 | D |

<Notes of Table>

Li—P—S: Li—P—S-based glass synthesized above.

B-1: PVdF-HFP KYNERFLEX2800-20 (trade name, manufactured by Arkema S.A., functional group: none, weight-average molecular weight: 100,000). This polymer dissolves in a dispersion medium.

B-2: Hydrogenated polystyrene butadiene DYNARONI321P (trade name, manufactured by JSR Corporation, functional group: none, weight-average molecular weight: 120,000). This polymer dissolves in a dispersion medium.

B-3: Polybutyl methacrylate-polymethacrylic acid-polyacrylonitrile copolymer (20/30/50% by mol, weight-average molecular weight: 14,300, number-average molecular weight: 7,800, a copolymer synthesized using a well-known radical polymerization method of the related art, functional group: carboxy group and nitrile group). This polymer dissolves in a dispersion medium.

B-4: Acrylic polymer particle (compound B-4 described in JP2015-088486A, functional group: carboxy group, average particle diameter: 0.35 μm, weight-average molecular weight: 50,000).

B-5: Urethane polymer (exemplary compound 34 described in JP2015-088480A, functional group: carboxy group, average particle diameter: 1 μm, weight-average molecular weight: 75,300).

Numerical values in the "kind" column for the dispersion medium (C) indicate the mixing ratio (mass-based) of the dispersion medium.

As the dispersion media in the table, the following commercially available products or commercially available products purified using the following methods were used.

—Dispersion Medium Purification Methods—

The dispersion medium was purified using any of the following purification methods (I), (II), and (III) singly or a combination thereof.

Purification method (I) "Benzophenone ketyl method": Benzophenone (1.0 g) and metallic sodium (1.0 g) were added to the dispersion medium (500 mL), refluxed for two hours, and then distilled away. The contents of both moisture and oxygen gas in the dispersion medium can be decreased using this method.

Purification method (II) "Freeze deaeration method": The dispersion medium (500 mL) was added to a 1 L three-neck flask and solidified by being cooled using liquid nitrogen in a nitrogen atmosphere. The ambient environment of the solidified dispersion medium was depressurized to a pressure of 1 mmHg, and the dispersion medium was sealed and slowly melted at room temperature. The above-described operation was repeated three times, thereby removing gas being dissolved in the dispersion medium. The content of oxygen gas in the dispersion medium can be decreased using this method (a significant decrease in the content of moisture cannot be estimated).

Purification method (III) "$CaH_2$ method": Calcium hydride (10.0 g) was added to the dispersion medium (500 mL), refluxed for two hours, and then distilled away. The content of moisture in the dispersion medium can be decreased using this method (a significant decrease in the content of oxygen gas cannot be estimated).

Tetrahydrofuran (amount of dissolved oxygen: 50 ppm, moisture content: 100 ppm): Tetrahydrofuran purified using the purification method (I)

Tetrahydrofuran (amount of dissolved oxygen: 25 ppm, moisture content: 70 ppm): Tetrahydrofuran purified using the purification method (I) and then the purification method (II)

Hexane (amount of dissolved oxygen: 20 ppm, moisture content: 50 ppm): Hexane purified using the purification method (III)

Toluene (amount of dissolved oxygen: 5 ppm, moisture content: 20 ppm): Toluene purified using the purification method (II)

Hexane (amount of dissolved oxygen: 2 ppm, moisture content: 20 ppm): Hexane purified using the purification method (II)

Tetrahydrofuran (amount of dissolved oxygen: 1 ppm, moisture content: 10 ppm): Deoxidation solvent (manufactured by Wako Pure Chemical Industries, Ltd.)

Tetrahydrofuran (amount of dissolved oxygen: 1 ppm, moisture content: 5 ppm): Deoxidation solvent (manufactured by Wako Pure Chemical Industries, Ltd.)

Hexane (amount of dissolved oxygen: 50 ppm, moisture content: 5 ppm): Hexane purified using the purification method (III)

Hexane (amount of dissolved oxygen: 1 ppm, moisture content: 5 ppm): Deoxidation solvent (manufactured by Wako Pure Chemical Industries, Ltd.)

Hexane/tetrahydrofuran (90/10) (amount of dissolved oxygen: 1 ppm, moisture content: 5 ppm): A mixture of individual deoxidation solvents (manufactured by Wako Pure Chemical Industries, Ltd.) in a predetermined mass proportion Heptane (amount of dissolved oxygen: 1 ppm, moisture content: 5 ppm): Deoxidation solvent (manufactured by Wako Pure Chemical Industries, Ltd.)

Hexane/toluene (80/20) (amount of dissolved oxygen: 1 ppm, moisture content: 5 ppm): A mixture of individual deoxidation solvents (manufactured by Wako Pure Chemical Industries, Ltd.) in a predetermined mass proportion Hexane/toluene (90/10) (amount of dissolved oxygen: 1 ppm, moisture content: 5 ppm): A mixture of individual deoxidation solvents (manufactured by Wako Pure Chemical Industries, Ltd.) in a predetermined mass proportion n-Butyl butyrate (amount of dissolved oxygen: 1 ppm, moisture content: 5 ppm): n-Butyl butyrate purified using the purification method (I)

Diisobutyl ketone (amount of dissolved oxygen: 1 ppm, moisture content: 5 ppm): Diisobutyl ketone purified using the purification method (I)

Octane/n-butyl butyrate (70/30) (amount of dissolved oxygen: 1 ppm, moisture content: 5 ppm): A mixture of dispersion media purified respectively using the purification method (I) in a predetermined mass proportion Propyl laurate (amount of dissolved oxygen: 1 ppm, moisture content: 5 ppm): Deoxidation solvent (manufactured by Wako Pure Chemical Industries, Ltd.)

Isobutyl isobutyrate (amount of dissolved oxygen: 1 ppm, moisture content: 5 ppm): A product manufactured by Tokyo Chemical Industry Co., Ltd. purified using the purification method (I)

Tetrahydrofuran (amount of dissolved oxygen: 2,000 ppm, moisture content: 1,000 ppm): First-grade product manufactured by Wako Pure Chemical Industries, Ltd.

Heptane (amount of dissolved oxygen: 2,000 ppm, moisture content: 100 ppm): First-grade product manufactured by Wako Pure Chemical Industries, Ltd.

n-Butyl butyrate (amount of dissolved oxygen: 1,500 ppm, moisture content: 20 ppm): First-grade product manufactured by Wako Pure Chemical Industries, Ltd.

n-Butyl butyrate (amount of dissolved oxygen: 200 ppm, moisture content: 20 ppm): n-Butyl butyrate purified using the purification method (III)

As is clear from Table 1, in the solid electrolyte compositions T-1 and T-5 having a too large moisture content and a too large amount of dissolved oxygen, both the initial ion conductivity and the retention of the ion conductivity were small. In addition, it is found that, in all of the solid electrolyte compositions T-2 to T-4 having a small moisture content but having a too large amount of dissolved oxygen, the initial ion conductivity was sufficient, but a sufficient ion conductivity could not be maintained. This is considered to be because, in contrast to the fact that the sulfide-based solid electrolyte rapidly deteriorates by moisture, the sulfide-based solid electrolyte is poorly reactive to oxygen gas, but slowly oxidizes, reacts, and thus deteriorates, and the ion conductivity decreases.

In contrast, in all of the solid electrolyte compositions S-1 to S-19 having an amount of dissolved oxygen of 20 ppm or less, the retention of the ion was high, and the ion conductivity could also be maintained for a long period of time. Furthermore, in a case in which the moisture content was 50 ppm or less, the initial ion conductivity also became high.

Example 2

In Example 2, compositions for a positive electrode were prepared, and the initial ion conductivity and the temporal stability of the ion conductivity were evaluated.

<Preparation of Composition for Positive Electrode>

(Preparation of Composition for Positive Electrode P-1)

Fifty zirconia beads having a diameter of 3 mm were injected into a 45 mL zirconia container (manufactured by Fritsch Japan Co., Ltd.), and the inorganic solid electrolyte composition synthesized above S-1 (6.8 g) was added thereto. A positive electrode active material LCO (3.2 g) was added thereto (mixing step), then, a bubbling treatment was carried out using dried argon for five minutes (deoxidization step), and the container was filled with argon gas. The container was set in a planetary ball mill P-7 (trade name, manufactured by Fritsch Japan Co., Ltd.), and the components were continuously stirred at a temperature of 25° C. and a rotation speed of 100 rpm for 10 hours (re-mixing step), thereby preparing a composition for a positive electrode P-1.

(Preparation of Compositions for Positive Electrode P-7, P-9, P-11, P-13, P-14, P-16, and P-17)

P-7, P-9, P-11, P-13, P-14, P-16, and P-17 were prepared respectively in the same manner as in the preparation of the composition for a positive electrode P-1 except for the fact that, in the preparation of the composition for a positive electrode P-1, the composition was changed to a composition shown in Table 2.

(Preparation of Compositions for Positive Electrode P-2 to P-6, P-8, P-10, P-12, and P-15)

Compositions for a positive electrode P-2 to P-6, P-8, P-10, P-12, and P-15 were prepared respectively in the same manner as in the preparation of the composition for a positive electrode P-1 except for the fact that, in the preparation of the composition for a positive electrode P-1, the composition was changed to a composition shown in Table 2 and the respective components were mixed together by filling the container with argon, dried air, or nitrogen gas without carrying out the bubbling treatment in which dried argon was used.

(Preparation of Compositions for Positive Electrode HP-1 to HP-4)

Compositions for a positive electrode HP-1 to HP-4 were prepared respectively in the same manner as in the preparation of the composition for a positive electrode P-4 except for the fact that, in the preparation of the composition for a positive electrode P-4, the composition was changed to a composition shown in Table 2.

<Measurement of Amount of Dissolved Oxygen and Moisture Content in Composition for Positive Electrode>

For the respective composition for a positive electrode obtained above, the amounts of dissolve oxygen and the moisture contents were measured in the same manner as for the solid electrolyte compositions, and the obtained results are shown in Table 2.

<Storage of Composition for Positive Electrode>

The respective composition for a positive electrode obtained above were stored for four weeks in the same manner as for the solid electrolyte compositions. References "-", "A", and "B" in Table 2 indicate the same methods as the corresponding references in Table 1.

<Measurement of Ion Conductivity>

For the obtained compositions for a positive electrode immediately after manufactured and the compositions for a positive electrode after stored, the ion conductivity was measured and the retention (%) of the ion conductivity was computed in the same manner as for the solid electrolyte compositions. The measured initial ion conductivity and the retention (%) of the computed ion conductivity are shown in Table 2.

TABLE 2

| Composition for positive electrode | Solid electrolyte composition | | Positive electrode active material | | Conductive auxiliary agent | | Deaeration treatment |
|---|---|---|---|---|---|---|---|
| | Kind | Parts by mass | Kind | Parts by mass | Kind | Parts by mass | |
| P-1 | S-1 | 6.8 | LCO | 3.2 | — | — | Ar bubbling |
| P-2 | S-2 | 4.4 | LCO | 2.8 | AB | 0.2 | No |
| P-3 | S-3 | 4.4 | LCO | 2.8 | AB | 0.2 | No |
| P-4 | S-4 | 4.4 | LCO | 2.8 | — | — | No |
| P-5 | S-5 | 4.4 | LCO | 2.8 | AB | 0.2 | No |
| P-6 | S-6 | 4.4 | NMC | 2.8 | AB | 0.2 | No |
| P-7 | S-7 | 6.8 | NMC | 4.2 | — | — | Ar bubbling |
| P-8 | S-8 | 6.8 | NMC | 4.2 | — | — | No |
| P-9 | S-9 | 6.8 | NMC | 4.2 | AB | 0.2 | Ar bubbling |
| P-10 | S-10 | 6.8 | NMC | 4.2 | — | — | No |
| P-11 | S-11 | 6.8 | NMC | 3.7 | — | — | Ar bubbling |
| P-12 | S-12 | 6.8 | NCA | 3.7 | VGCF | 0.2 | No |
| P-13 | S-13 | 6.8 | NCA | 3.7 | — | — | Ar bubbling |
| P-14 | S-14 | 6.8 | NCA | 3.7 | VGCF | 0.2 | Ar bubbling |
| P-15 | S-15 | 6.8 | NMC | 3.2 | AB | 0.4 | No |

TABLE 2-continued

| | | | | | | | |
|---|---|---|---|---|---|---|---|
| P-16 | S-16 | 6.8 | NMC | 3.2 | AB | 0.4 | Ar bubbling |
| P-17 | S-16X | 6.8 | NMC | 3.2 | AB | 0.4 | Ar bubbling |
| HP-1 | T-1 | 6.8 | LMO | 4.2 | — | — | No |
| HP-2 | T-2 | 6.8 | LMO | 4.2 | — | — | No |
| HP-3 | T-4 | 6.8 | NMC | 3.2 | AB | 0.2 | No |
| HP-4 | T-4X | 6.8 | NMC | 3.2 | AB | 0.2 | No |

| | | | Evaluation | | | |
|---|---|---|---|---|---|---|
| Composition for positive electrode | Dispersion atmosphere | Storage method | Amount of dissolved oxygen (ppm) | Moisture content (ppm) | Initial ion conductivity (mS/cm) | Retention of the ion conductivity |
| P-1 | Ar | — | 20 | 80 | 0.064 | C |
| P-2 | Ar | B | 15 | 70 | 0.085 | C |
| P-3 | Ar | — | 20 | 50 | 0.099 | B |
| P-4 | dry Air | — | 10 | 20 | 0.111 | B |
| P-5 | dryAir | A | 10 | 20 | 0.127 | B |
| P-6 | dryAir | — | 5 | 10 | 0.119 | B |
| P-7 | Ar | — | 5 | 10 | 0.099 | A |
| P-8 | $N_2$ | A | 5 | 10 | 0.140 | B |
| P-9 | Ar | A | 10 | 15 | 0.123 | A |
| P-10 | $N_2$ | B | 10 | 10 | 0.143 | B |
| P-11 | Ar | — | 1 | 5 | 0.131 | A |
| P-12 | dryAir | B | 1 | 5 | 0.142 | B |
| P-13 | Ar | — | 1 | 5 | 0.152 | A |
| P-14 | Ar | B | 5 | 5 | 0.134 | A |
| P-15 | dryAir | — | 5 | 5 | 0.116 | B |
| P-16 | Ar | B | 1 | 1 | 0.148 | A |
| P-17 | Ar | B | 5 | 5 | 0.155 | A |
| HP-1 | dryAir | — | 2000 | 200 | 0.121 | E |
| HP-2 | dryAir | — | 2000 | 5 | 0.132 | E |
| HP-3 | dryAir | — | 300 | 5 | 0.112 | D |
| HP-4 | dryAir | — | 500 | 5 | 0.001 | E |

<Notes of Table>
LCO: $LiCoO_2$
LMO: $LiMn_2O_4$
NCA: $LiNi_{0.85}Co_{0.10}Al_{0.05}O_2$
NMC: $LiNi_{1/3}Co_{1/3}Mn_{1/3}O_2$
AB: Acetylene black
VGCF: Vapor grown carbon nanotube (manufactured by Showa Denko K.K.)
S-16X: S-16 stored for four weeks (the storage method is B)
T-4X: T-4 stored for four weeks (the storage method is B)

As is clear from Table 2, in the composition for a positive electrode HP-1 having a too large moisture content and a too large amount of dissolved oxygen, both the initial ion conductivity and the retention of the ion conductivity were small. In addition, it is found that, in all of the compositions for a positive electrode HP-2 to HP-4 having a small moisture content but having a too large amount of dissolved oxygen, the initial ion conductivity was sufficient, but a sufficient ion conductivity could not be maintained.

In contrast, in all of the compositions for a positive electrode P-1 to P-17 having an amount of dissolved oxygen of 20 ppm or less, the retention of the ion conductivity was high, and the ion conductivity could also be maintained for a long period of time. Furthermore, in a case in which the moisture content was 50 ppm or less, the initial ion conductivity also became high.

Example 3

In Example 3, solid electrolyte-containing sheets were produced, and the initial ion conductivity and the temporal stability of the ion conductivity were evaluated.
<Production of Solid Electrolyte-Containing Sheet>
The slurry of the solid electrolyte composition S-1 prepared in Example 1 was applied onto a 50 μm-thick TEFLON (registered trademark) base material using an applicator (trade name: SA-201 Baker-type applicator, manufactured by Tester Sangyo Co., Ltd.) and heated at 80° C. for 10 minutes on a hot plate, thereby removing the dispersion medium. A solid electrolyte-containing sheet for an all-solid state secondary battery SS-1 having a thickness of approximately 80 μm (including the base material) was obtained in the above-described manner.

Solid electrolyte-containing sheets SS-2 to SS-17 and TS-1 to TS-4 were produced in the same manner as the solid electrolyte-containing sheet for the all-solid state secondary battery SS-1 except for the fact that, in the production of the solid electrolyte-containing sheet for the all-solid state secondary battery SS-1, a solid electrolyte composition shown in Table 3 was used instead of the solid electrolyte composition S-1.

Meanwhile, a solid electrolyte composition S-16X was a solid electrolyte composition S-16 that had been stored for four weeks (the storage method is B). In addition, a solid electrolyte composition T-4X was a solid electrolyte composition T-4 that had been stored for four weeks (the storage method is B).
<Measurement of Amount of Dissolved Oxygen in Solid Electrolyte-Containing Sheet>

The solid electrolyte-containing sheet (length 30 cm×width 10 cm) obtained above was put into LAMIZIP in which a detection portion of the oxygen meter sensor that the above-described dissolved oxygen concentration measurement meter was prepared, and the inside of the LAMIZIP was depressurized to 200 mmHg. After depressurization, the LAMIZIP was sealed and left to stand for one hour until oxygen dissolved in the solid electrolyte-containing sheet filled the LAMIZIP space (until the amount of dissolved oxygen of the sheet and the oxygen concentration in the LAMIZIP space reached equilibrium). After that, the amount of dissolved oxygen was measured. The amount of dissolved oxygen is a value after one minute immediately after the initiation of the measurement.

<Storage of Solid Electrolyte-Containing Sheet>

The solid electrolyte-containing sheet (length 30 cm×width 10 cm) obtained above was put into a laminate film bag with a non-oxygen-transmitting crucible (trade name: LAMIZIP, manufactured by Seisannipponsha Ltd.) in a dried air (dew point: −70° C.) and stored at 25° C. for four weeks.

In the "storage method" column in Table 3, a case in which the oxygen scavenger (F) was not used during the storage of the solid electrolyte-containing sheet is indicated by "-", and a case in which the oxygen scavenger (F) (1.0 g) was put into and used in the LAMIZIP is indicated by "o".

<Measurement of Ion Conductivity>

For the solid electrolyte-containing sheets immediately after produced and the solid electrolyte-containing sheets after stored, the ion conductivity was measured and the retention (%) of the ion conductivity was computed in the same manner as for the solid electrolyte compositions. The measured initial ion conductivity and the retention (%) of the computed ion conductivity are shown in Table 3.

TABLE 3

| Solid electrolyte-containing sheet | Solid electrolyte composition | Storage method | Evaluation | |
|---|---|---|---|---|
| | | | Amount of dissolved oxygen (ppm) | Retention of the ion conductivity |
| SS-1 | S-1 | — | 20 | C |
| SS-2 | S-2 | — | 15 | B |
| SS-3 | S-3 | — | 20 | B |
| SS-4 | S-4 | — | 5 | B |
| SS-5 | S-5 | — | 5 | B |
| SS-6 | S-6 | o | 1 | A |
| SS-7 | S-7 | o | 1 | A |
| SS-8 | S-8 | — | 1 | B |
| SS-9 | S-9 | — | 0.5 | B |
| SS-10 | S-10 | o | 0.2 | A |
| SS-11 | S-11 | — | 0.2 | B |
| SS-12 | S-12 | o | 0.2 | A |
| SS-13 | S-13 | o | 0.2 | A |
| SS-14 | S-14 | o | 0.1 | A |
| SS-15 | S-15 | — | 0.1 | A |
| SS-16 | S-16 | o | 0.1 | A |
| SS-17 | S-16X | o | 0.5 | A |
| TS-1 | T-1 | — | 100 | E |
| TS-2 | T-2 | — | 100 | E |
| TS-3 | T-4 | — | 50 | E |
| TS-4 | T-4X | — | 50 | D |

As is clear from Table 3, it is found that, in all of the solid electrolyte-containing sheets TS-1 to TS-4 having a too large amount of dissolved oxygen, the ion conductivity could not be sufficiently maintained. In contrast, in all of the solid electrolyte-containing sheets SS-1 to SS-17 having an amount of dissolved oxygen of 20 ppm or less, the retention of the ion conductivity was high, and the ion conductivity could also be maintained for a long period of time.

Example 4

In Example 4, electrode sheets were produced, and the initial ion conductivity and the temporal stability of the ion conductivity were evaluated.

<Production of Electrode Sheet>

(Preparation of Electrode Sheet PS-1)

The slurry of the composition for a positive electrode P-1 prepared in Example 2 was applied onto a 40 μm-thick aluminum foil using an applicator (trade name: SA-201 Baker-type applicator, manufactured by Tester Sangyo Co., Ltd.) and heated at 120° C. for one hour using a heat press, thereby removing the dispersion medium. An electrode sheet for an all-solid state secondary battery PS-1 having a thickness of approximately 160 μm (including the aluminum foil) (electrode sheet for a positive electrode PS-1) was obtained in the above-described manner.

(Preparation of Electrode Sheets PS-2 to PS-17 and HPS-1 to HPS-4)

Electrode sheets for an all-solid state secondary battery PS-2 to PS-17 and HPS-1 to HPS-4 were produced in the same manner as the electrode sheet for an all-solid state secondary battery PS-1 except for the fact that, in the production of the electrode sheet for an all-solid state secondary battery PS-1, a composition for a positive electrode shown in Table 4 was used instead of the composition for a positive electrode P-1.

Meanwhile, a solid electrolyte composition S-16X was a solid electrolyte composition S-16 that had been stored for four weeks (the storage method is B). In addition, a solid electrolyte composition T-4X was a solid electrolyte composition T-4 that had been stored for four weeks (the storage method is B).

<Measurement of Amount of Dissolved Oxygen in Electrode Sheet for all-Solid State Secondary Battery>

The electrode sheet for an all-solid state secondary battery (length 30 cm×width 10 cm) obtained above was put into LAMIZIP in which a detection portion of the oxygen meter sensor that the above-described dissolved oxygen concentration measurement meter was prepared, and the inside of the LAMIZIP was depressurized to 200 mmHg. After depressurization, the LAMIZIP was sealed and left to stand for one hour until oxygen dissolved in the electrode sheet for an all-solid state secondary battery filled the LAMIZIP space (until the amount of dissolved oxygen of the sheet and the oxygen concentration in the LAMIZIP space reached equilibrium). After that, the amount of dissolved oxygen was measured. The amount of dissolved oxygen is a value after one minute immediately after the initiation of the measurement.

<Storage of Electrode Sheet for all-Solid State Secondary Battery>

The electrode sheet for an all-solid state secondary battery (length 30 cm×width 10 cm) obtained above was put into a laminate film bag with a non-oxygen-transmitting crucible (trade name: LAMIZIP, manufactured by Seisannipponsha Ltd.) in a dried air (dew point: −70° C.) and stored at 25° C. for four weeks.

In the "storage method" column in Table 4, a case in which the oxygen scavenger (F) was not used during the storage of the electrode sheet for an all-solid state secondary battery is indicated by "-", and a case in which the oxygen scavenger (F) (1.0 g) was put into and used in the LAMIZIP is indicated by "o".

<Measurement of Ion Conductivity>

For the electrode sheets for an all-solid state secondary battery immediately after produced and the electrode sheets for an all-solid state secondary battery after stored, the ion conductivity was measured and the retention (%) of the ion conductivity was computed in the same manner as for the solid electrolyte compositions. The measured initial ion conductivity and the retention (%) of the computed ion conductivity are shown in Table 4.

TABLE 4

| Positive electrode sheet | Solid electrolyte composition | Storage method | Amount of dissolved oxygen (PPm) | Retention of the ion conductivity |
|---|---|---|---|---|
| PS-1 | P-1 | — | 20 | C |
| PS-2 | P-2 | — | 15 | C |
| PS-3 | P-3 | — | 20 | C |
| PS-4 | P-4 | ○ | 5 | B |
| PS-5 | P-5 | ○ | 5 | B |
| PS-6 | P-6 | — | 1 | B |
| PS-7 | P-7 | — | 1 | B |
| PS-8 | P-8 | ○ | 1 | A |
| PS-9 | P-9 | — | 0.5 | B |
| PS-10 | P-10 | ○ | 0.2 | A |
| PS-11 | P-11 | ○ | 0.2 | A |
| PS-12 | P-12 | ○ | 0.2 | B |
| PS-13 | P-13 | ○ | 0.2 | B |
| PS-14 | P-14 | ○ | 0.1 | A |
| PS-15 | P-15 | ○ | 0.1 | A |
| PS-16 | P-16 | ○ | 0.1 | A |
| PS-17 | P-16X | ○ | 0.5 | A |
| HPS-1 | HP-1 | — | 100 | E |
| HPS-2 | HP-2 | — | 100 | E |
| HPS-3 | HP-4 | — | 50 | E |
| HPS-4 | HP-4X | — | 50 | D |

As is clear from Table 4, it is found that, in all of the solid electrolyte-containing sheets TS-1 to TS-4 having a too large amount of dissolved oxygen, the ion conductivity could not be sufficiently maintained. In contrast, in all of the solid electrolyte-containing sheets SS-1 to SS-17 having an amount of dissolved oxygen of 20 ppm or less, the retention of the ion conductivity was high, and the ion conductivity could also be maintained for a long period of time.

Example 5

In Example 5, all-solid state secondary batteries were manufactured using the solid electrolyte-containing sheets produced in Example 3, the electrode sheets produced in Example 4, and a negative electrode formed of metallic lithium, and battery performance (battery voltage and the number of short-circuit cycles) was evaluated.

<Production of all-Solid State Secondary Batteries>
(Production of all-Solid State Secondary Battery C-1)

A 22 mm×22 mm piece cut out from the solid electrolyte-containing sheet SS-1 was attached onto a 20 mm×20 mm piece cut out from the electrode sheet for an all-solid state secondary battery PS-1, and the TEFLON (registered trademark) sheet was removed. The negative electrode made of a metallic Li foil (film thickness: 100 µm, manufactured by Honjo Metal Co., Ltd) was attached to this solid electrolyte layer side and pressed at 300 MPa for five seconds using a pressing machine.

Figure 2:
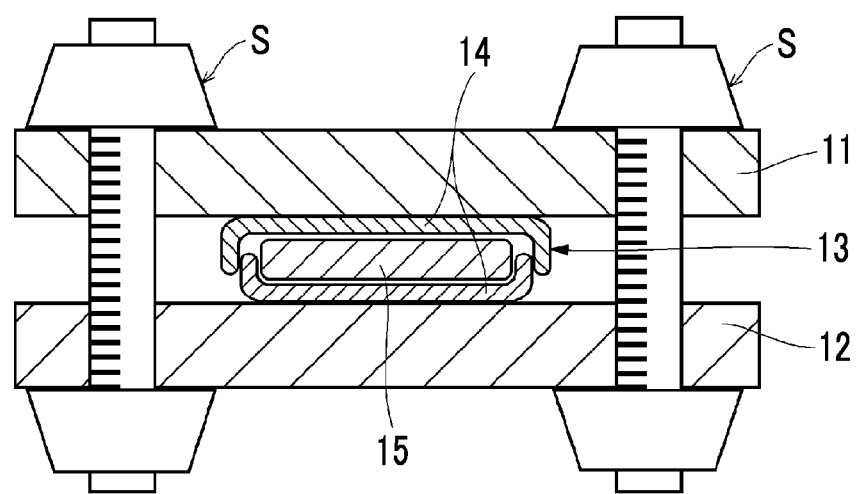
FIG. 2 is a vertical cross-sectional view schematically illustrating a coin-type holding device produced in an example.

As shown in FIG. 2, a disc-shaped piece having a diameter of 14.5 mm was cut out from the electrode sheet for an all-solid state secondary battery manufactured above and put into a 2032-type stainless steel coin case by combining a spacer and a washer (both not illustrated in FIG. 2) together, the coin case was swaged using a torque wrench at eight newtons (N), thereby manufacturing an all-solid state secondary battery having the layer constitution shown in FIG. 1 (however, not having the negative electrode collector 1).

(Production of all-Solid State Secondary Batteries C-2 to C-19 and HC-1 to HC-4X)

All-solid state secondary batteries C-2 to C-19 and HC-1 to HC-4X were produced in the same manner as in the production of the all-solid state secondary battery C-1 except for the fact that, in the production of the all-solid state secondary battery C-1, the electrode sheet for an all-solid state secondary battery and the solid electrolyte-containing sheet were used in a combination shown in Table 5.

Meanwhile, an electrode sheet for an all-solid state secondary battery PS-16X was an electrode sheet for an all-solid state secondary battery PS-16 that had been stored for four weeks (the storage method is B). In addition, an electrode sheet for an all-solid state secondary battery PS-17X was an electrode sheet for an all-solid state secondary battery PS-17 that had been stored for four weeks (the storage method is B). Furthermore, a solid electrolyte-containing sheet SS-16X was a solid electrolyte-containing sheet SS-16 that had been stored for four weeks (the storage method is B). In addition, a solid electrolyte-containing sheet SS-17X was a solid electrolyte-containing sheet SS-17 that had been stored for four weeks (the storage method is B). An electrode sheet for an all-solid state secondary battery HPS-4X was an electrode sheet for an all-solid state secondary battery HPS-4 that had been stored for four weeks (the storage method is B). A solid electrolyte-containing sheet TS-4X was a solid electrolyte-containing sheet TS-4 that had been stored for four weeks (the storage method is B).

<Measurement of Battery Voltage and Evaluation of Number of Short Circuit Cycles>

The all-solid state secondary battery produced above was charged at a current density of 2 A/m² until the battery voltage reached 4.2 V, and, after the battery voltage reached 4.2 V, the all-solid state secondary battery was charged at a constant voltage until the current density reached less than 0.2 A/m². After that, the all-solid state secondary battery was discharged at a current density of 2 A/m² until the battery voltage reached 3.0 V. This charging and discharging was regarded as one cycle, this cycle was repeated three times, and the battery voltage after 5 mAh/g of discharge at the third cycle was scanned.

The battery voltage was measured using a charging and discharging evaluation device "TOSCAT-3000" (trade name, manufactured by Toyo System Co., Ltd.). The measured battery voltage was determined by which of the following evaluation ranks the measured battery voltage was included. In the present test, the voltage with an evaluation rank of "C" or higher is pass.

—Evaluation Ranks of Battery Voltage—
A: The voltage is 4.0 V or more.
B: The voltage is 3.9 V or more and less than 4.0 V.
C: The voltage is 3.8 V or more and less than 3.9 V.
D: The voltage is 3.7 V or more and less than 3.8 V.
E: The voltage is less than 3.7 V.

In addition, this charging and discharging was regarded as one cycle, the charging and discharging were repeated, and the number of cycles necessary for the all-solid state secondary battery to short-circuit was recorded. The number of short-circuit cycles was determined by which of the following evaluation ranks the number of short-circuit cycles was included. In the present test, the number of short-circuit cycles with an evaluation rank of "C" or higher is pass.

—Evaluation Ranks of Number of Short-Circuit Cycles—
A: 50 Cycles or more
B: 30 cycles or more and less than 50 cycles
C: 20 cycles or more and less than 30 cycles
D: 5 cycles or more and less than 20 cycles
E: Less than 5 cycles

TABLE 5

| All-solid state secondary battery | Positive electrode sheet | Solid electrolyte composition | Negative electrode | Evaluation Battery voltage | Number of short circuit cycles |
|---|---|---|---|---|---|
| C-1 | PS-1 | SS-1 | Li | C | C |
| C-2 | PS-2 | SS-2 | Li | C | C |
| C-3 | PS-3 | SS-3 | Li | B | c |
| C-4 | PS-4 | SS-4 | Li | A | B |
| C-5 | PS-5 | SS-5 | Li | B | B |
| C-6 | PS-6 | SS-6 | Li | B | B |
| C-7 | PS-7 | SS-7 | Li | A | B |
| C-8 | PS-8 | SS-8 | Li | B | A |
| C-9 | PS-9 | SS-9 | Li | B | B |
| C-10 | PS-10 | SS-10 | Li | A | A |
| C-11 | PS-11 | SS-11 | Li | A | A |
| C-12 | PS-12 | SS-12 | Li | B | B |
| C-13 | PS-13 | SS-13 | Li | A | B |
| C-14 | PS-14 | SS-14 | Li | A | A |
| C-15 | PS-15 | SS-15 | Li | A | A |
| C-16 | PS-16 | SS-16 | Li | A | A |
| C-17 | PS-16X | SS-16X | Li | A | A |
| C-18 | PS-17X | SS-16X | Li | A | A |
| C-19 | PS-17X | SS-17X | Li | A | A |
| HC-1 | HPS-1 | TS-1 | Li | E | D |
| HC-2 | HPS-2 | TS-2 | Li | D | E |
| HC-3 | HPS-3 | TS-3 | Li | D | E |
| HC-4 | HPS-4 | TS-4 | Li | D | D |
| HC-4X | HPS-4X | TS-4X | Li | E | E |

As is clear from Table 5, it is found that, in all of the all-solid state secondary batteries HC-1 to HC-4X in which the solid electrolyte-containing sheet having a too large amount of dissolved oxygen was used for the positive electrode active material layer and the solid electrolyte layer of the all-solid state secondary battery, the initial ion conductivity could not be maintained. In contrast, in the all-solid state secondary batteries C-1 to C-19 in which the solid electrolyte layer and the positive electrode active material layer were formed using the solid electrolyte-containing sheets SS-1 to SS-17X having an amount of dissolved oxygen of 20 ppm or less and the electrode sheets PS-1 to PS-17X, the ion conductivity could be maintained even in the case of using the sulfide-based solid electrolyte as the solid electrolyte. Therefore, an increase in the resistance could be also suppressed, and, even in the case of using a lithium metal negative electrode, lithium dendrite was suppressed, and, furthermore, the charge and discharge cycle service life until short circuit occurs becomes long.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2017-176352 filed on Sep. 14, 2017 in Japan, the content of which is incorporated herein by reference.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: upper portion-supporting plate
12: lower portion-supporting plate
13: coin-type holding device
14: cylindrical case
S: screw

What is claimed is:

1. A solid electrolyte composition comprising:
   a sulfide-based solid electrolyte (A) having conductivity of ions of metals belonging to Group I or II of the periodic table;
   a binder (B); and
   a dispersion medium (C), wherein an amount of dissolved oxygen in the dispersion medium (C) is 1 ppmv or less,
   wherein an amount of dissolved oxygen in the solid electrolyte composition is 20 ppmv or less,
   the amount of dissolved oxygen is an amount of the oxygen gas contained in the solid electrolyte composition, and a value measured after preparation of the solid electrolyte composition is regarded as the amount of dissolved oxygen.

2. The solid electrolyte composition according to claim 1, wherein a moisture content in the solid electrolyte composition is 50 ppm or less.

3. The solid electrolyte composition according to claim 1, wherein the dispersion medium (C) is a hydrocarbon compound solvent, an ester compound solvent, an ether compound solvent, a ketone compound solvent, or a combination of two or more thereof.

4. The solid electrolyte composition according to claim 1, wherein the dispersion medium (C) is a compound having 7 to 14 carbon atoms.

5. The solid electrolyte composition according to claim 1, wherein the dispersion medium (C) has a hydrocarbon group and the hydrocarbon group has a branched structure or a cyclic structure.

6. The solid electrolyte composition according to claim 1, wherein the dispersion medium (C) contains 20% to 100% by mass of a hydrocarbon compound solvent.

7. The solid electrolyte composition according to claim 1, wherein the binder (B) includes a (meth)acrylic polymer, a urethane polymer, a urea polymer, an amide polymer, an imide polymer, an ester polymer, hydrocarbon rubber, or fluorine rubber, or a combination of two or more thereof which has a weight-average molecular weight of 1,000 to 500,000.

8. The solid electrolyte composition according to claim 1, wherein the binder (B) includes a polymer having at least one functional group selected from the group of functional groups consisting of a hydroxy group, a carboxy group, a sulfo group, a phosphoric acid group, an amino group, and a nitrile group.

9. The solid electrolyte composition according to claim 1, wherein the binder (B) is polymer particles having an average particle diameter of 0.01 to 10 μm.

10. The solid electrolyte composition according to claim 1, further comprising an active material (D).

11. The solid electrolyte composition according to claim 1, further comprising a conductive auxiliary agent (E).

12. The solid electrolyte composition according to claim 1, further comprising an oxygen scavenger (F).

13. A manufacturing method of the solid electrolyte composition according to claim 1, the method comprising:
   a step of mixing the sulfide-based solid electrolyte (A) and the dispersion medium (C); and
   a step of deoxidizing an obtained mixture so that the amount of dissolved oxygen in the mixture reaches 20 ppmv or less.

14. A manufacturing method of the solid electrolyte composition according to claim 1, the method comprising:
a step of mixing the sulfide-based solid electrolyte (A) and a dispersion medium (C1) deaerated to an amount of dissolved oxygen of 1 ppmv or less in an inert gas atmosphere.

15. A solid electrolyte composition kit formed by combining the solid electrolyte composition according to claim 1 and an oxygen scavenger (F).

16. A storage method of a solid electrolyte composition, wherein the solid electrolyte composition according to claim 1 is subjected to at least one of steps described below,
(i) a step of storing the solid electrolyte composition in an inert gas atmosphere in a sealed environment,
(ii) a step of storing the solid electrolyte composition after being impregnated with an oxygen scavenger (F) or
(iii) a step of storing the solid electrolyte composition together with the oxygen scavenger (F) in a sealed environment.

17. A storage method of a solid electrolyte composition, wherein the solid electrolyte composition is stored together with the oxygen scavenger (F) in a sealed environment using the solid electrolyte composition kit according to claim 15.

18. A solid electrolyte-containing sheet comprising:
a layer made of a solid electrolyte composition including
a sulfide-based solid electrolyte (A) having conductivity of ions of metals belonging to Group I or II of the periodic table;
a binder (B); and
a dispersion medium (C),
wherein an amount of dissolved oxygen included in a pore in the solid electrolyte-containing sheet is 20 ppmv or less.

19. A solid electrolyte-containing sheet comprising:
a layer made of a solid electrolyte composition including
a sulfide-based solid electrolyte (A) having conductivity of ions of metals belonging to Group I or II of the periodic table;
a binder (B); and
a dispersion medium (C),
wherein an amount of dissolved oxygen included in a pore in the solid electrolyte-containing sheet is 20 ppmv or less,
wherein the solid electrolyte composition is the solid electrolyte composition according to claim 1.

20. A storage method of a solid electrolyte-containing sheet, wherein the solid electrolyte-containing sheet according to claim 18 is stored in a sealed environment having an oxygen concentration of 20 ppmv or less.

21. A solid electrolyte-containing sheet kit formed by combining a solid electrolyte-containing sheet according to claim 18 and an oxygen scavenger (F).

22. A storage method of a solid electrolyte-containing sheet, wherein the solid electrolyte-containing sheet is stored in a sealed environment in the presence of an oxygen scavenger (F) using the solid electrolyte-containing sheet kit according to claim 21.

23. An all-solid state secondary battery obtained by using the solid electrolyte composition according to claim 1.

24. An all-solid state secondary battery obtained by using the solid electrolyte-containing sheet according to claim 18.

* * * * *